United States Patent
Leon et al.

(10) Patent No.: US 11,921,473 B2
(45) Date of Patent: Mar. 5, 2024

(54) METHODS AND APPARATUS TO GENERATE ACCEPTABILITY CRITERIA FOR AUTONOMOUS SYSTEMS PLANS

(71) Applicant: Intel Corporation, Santa Clara, CA (US)

(72) Inventors: Javier Felip Leon, Hillsboro, OR (US); Javier Sebastian Turek, Beaverton, OR (US); David I. Gonzalez Aguirre, Hillsboro, OR (US); Ignacio Javier Alvarez, Portland, OR (US); Luis Carlos Maria Remis, Hillsboro, OR (US); Justin Gottschlich, Santa Clara, CA (US)

(73) Assignee: INTEL CORPORATION, Santa Clara, CA (US)

( * ) Notice: Subject to any disclaimer, the term of this patent is extended or adjusted under 35 U.S.C. 154(b) by 1286 days.

(21) Appl. No.: 16/456,957

(22) Filed: Jun. 28, 2019

(65) Prior Publication Data
US 2019/0317455 A1     Oct. 17, 2019

(51) Int. Cl.
G05B 13/02    (2006.01)
G05B 13/04    (2006.01)
G06N 3/086    (2023.01)
G06N 3/088    (2023.01)
G06N 20/00    (2019.01)

(52) U.S. Cl.
CPC ........... *G05B 13/027* (2013.01); *G05B 13/04* (2013.01); *G06N 3/086* (2013.01); *G06N 3/088* (2013.01); *G06N 20/00* (2019.01)

(58) Field of Classification Search
CPC ...... G05B 13/027; G05B 13/04; G06N 3/086; G06N 3/088; G06N 20/00; G06N 3/042; G06N 3/044; G06N 3/045; G06N 3/08; G06N 5/025
See application file for complete search history.

(56) References Cited

U.S. PATENT DOCUMENTS 10,019,011 B1 *  7/2018  Green ............... B60W 60/0017
10,061,322 B1 *  8/2018  Palefsky-Smith ... G06V 10/764
(Continued)

OTHER PUBLICATIONS

Gottschlich et al., "The Pillars of Machine Programming," Jun. 2018, Intel Labs, MIT, 11 pages.
(Continued)

*Primary Examiner* — Joseph J Dallo
(74) *Attorney, Agent, or Firm* — Hanley, Flight & Zimmerman, LLC

(57) ABSTRACT

Apparatus, systems, articles of manufacture, and methods to generate acceptability criteria for autonomous systems plans are disclosed. An example apparatus includes a data compiler to compile data generated by the autonomous system into an autonomous system task dataset, a data encoder to encode the dataset for input into a rule distillation neural network architecture, a model trainer to train the rule distillation neural network architecture, an adaptor to adapt the trained rule distillation neural network architecture to a new input data domain using the autonomous system task dataset, a verifier to generate formally verified acceptability criteria, and an inferer to evaluate a control command, the evaluation resulting in an acceptance or rejection of the command.

25 Claims, 11 Drawing Sheets

(56) References Cited

U.S. PATENT DOCUMENTS

| | | | | |
|---|---|---|---|---|
| 10,825,318 | B1* | 11/2020 | Williams | G16H 40/67 |
| 2016/0001096 | A1* | 1/2016 | Mishelevich | A61N 7/02 |
| | | | | 601/2 |
| 2017/0028563 | A1* | 2/2017 | Hemken | B25J 11/0005 |
| 2017/0083772 | A1* | 3/2017 | Kim | B60C 9/00 |
| 2017/0135621 | A1* | 5/2017 | Lee | A61B 5/18 |
| 2018/0157934 | A1* | 6/2018 | Hu | G06V 30/19147 |
| 2018/0189581 | A1* | 7/2018 | Turcot | G06V 20/597 |
| 2018/0232508 | A1* | 8/2018 | Kursun | G06N 3/045 |
| 2018/0260651 | A1* | 9/2018 | Wang | G06V 20/56 |
| 2018/0275667 | A1* | 9/2018 | Liu | B60W 50/029 |
| 2018/0276912 | A1* | 9/2018 | Zhou | G05B 23/0275 |
| 2018/0293454 | A1* | 10/2018 | Xu | G06V 20/49 |
| 2018/0293756 | A1* | 10/2018 | Liu | G06N 3/045 |
| 2018/0314899 | A1* | 11/2018 | Dreyfuss | G06N 3/063 |
| 2018/0322629 | A1* | 11/2018 | Hu | G06T 7/75 |
| 2019/0213256 | A1* | 7/2019 | Watson | G06F 40/30 |
| 2020/0125472 | A1* | 4/2020 | Arechiga Gonzalez | |
| | | | | G06F 11/3461 |

OTHER PUBLICATIONS

Airskin, "Blue Danube Robotics GmbH", Online: <https://www.bluedanuberobotics.com/airskin>, Apr. 15, 2019 accessed via <https://web.archive.org/web/20190415121434/https://www.bluedanuberobotics.com/airskin/> on Nov. 7, 2019 (7 pages).
Unified Robot Description Format. Online: <http://wiki.ros.org/urdf>, Jan. 1, 2011 (6 pages).
SD Format, Online: <http://sdformat.org.>, Apr. 27, 2019 accessed via <https://web.archive.org/web/20190427163917/http://sdformat.org/> on Nov. 7, 2019 (3 pages).
COLLADA. COLLAborative Design Activity. Khronos Group. Online: <https://www.khronos.org/collada/>, 2019 (6 pages).
Lavalle, Steven M. "Chapter 8: Feedback Motion Planning", "Chapter 9: Basic Decision Theory", Planning Algorithms, Cambridge University Press, 2006 (196 pages).
Gazebo Robot Simulator. Online: <http://gazebosim.org/Ga>, 2014 (7 pages).
Todorov, et al. "Mujoco: A physics engine for model-based control," IEEE/RSJ International Conference on Intelligent Robots and Systems, University of Washington, 2012 (8 pages).
Ganin, et al. "Unsupervised domain adaption by backpropagation," Proceedings of the 32nd International Conference on Machine Learning (ICML), Feb. 2015, (10 pages).
Abbas, et al. "Relaxed decidability and the robust semantics of Metric Temporal Logic," University of Pennsylvania ScholarlyCommons, In Proceedings of the 20th International Conference on Hybrid Systems: Computation and Control (pp. 217-225), Feb. 2017 (15 pages).
Miyato et al. "Virtual Adversarial Training: A Regularization Method for Supervised and Semi-Supervised Learning", IEEE Transactions on Pattern Analysis and Machine Intelligence, Jun. 27, 2018 (16 pages).
Koymans, Ron. "Specifying Real-Time Properties with Metric Temporal Logic," 1990, Real-time systems, 2(4), 255-299 (2 pages).
Ben-David et al. "A theory of learning from different domains," Machine Learning, vol. 79, issue 1-2, pp. 151-175, Springerlink.com, Oct. 2009, (25 pages).
Shu et al. "A Dirt-T Approach to Unsupervised Domain Adaptation," International Conference on Learning Representations (ICLR), Feb. 2018 (19 pages).
V-REP. Virtual Robot Experimentation Platform. Online: <http://www.coppeliarobotics.com/>, 2019, accessed via <https://web.archive.org/web/20190610012911/http://www.coppeliarobotics.com/> Jun. 10, 2019 (5 pages).
Goldberg, Yoav. "Neural Network Methods in Natural Language Processing," Morgan & Claypool Publishers, Apr. 2017, (1 page). (Abstract Only Provided).

* cited by examiner

METHODS AND APPARATUS TO GENERATE ACCEPTABILITY CRITERIA FOR AUTONOMOUS SYSTEMS PLANS

FIELD OF THE DISCLOSURE

This disclosure relates generally to autonomous systems plans, and, more particularly, to methods and apparatus to generate acceptability criteria for autonomous systems plans.

BACKGROUND

Deep Reinforcement Learning (DRL) draws upon deep learning and reinforcement learning principles to develop algorithms for use in a variety of applications, including robotics, gaming, finance, transportation, and healthcare. For example, development of completely autonomous intelligent robotic systems relies on the use of DRL to solve complex, real-world problems in the absence of prior information about a given environment in which a robot is to operate. DRL permits autonomous systems to continually evolve and learn through multiple time step sequences that move the system towards an optimal solution in any given scenario.

BRIEF DESCRIPTION OF THE DRAWINGS

In general, the same reference numbers will be used throughout the drawings) and accompanying written description to refer to the same or like parts.

DETAILED DESCRIPTION

Figure 1A:
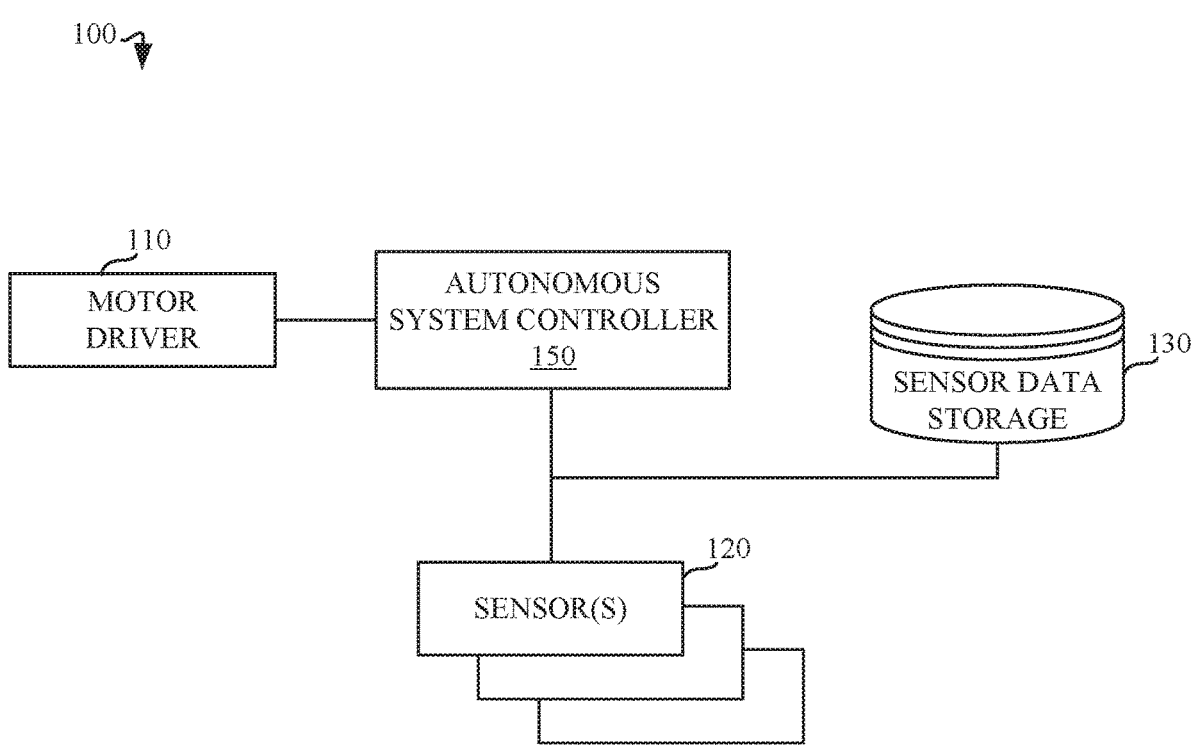
FIG. 1A is a block diagram illustrating an example environment in which an autonomous system controller used for acceptability criteria generation is implemented.

Deep Reinforcement Learning (DRL) is widely used to program autonomous systems to perform and solve complicated tasks via goal-oriented algorithms. Such algorithms can be either supervised or unsupervised and linear or non-linear. In a supervised algorithm, all data is labeled (e.g., images of animals) and the algorithm learns to predict the output from an input data set, while in an unsupervised algorithm all data is unlabeled (e.g., no labels associated with an image) and the algorithm learns to model the underlying structure or distribution of data in order to "learn" more about a given data set. A large amount of input data where only some of the data is labeled is known as semi-supervised algorithm learning. The learning process permits a system to learn features and transform them into class labels for segmentation or classification. In DRL, artificial neural networks (e.g., mathematical models) are used as an approach to approximate functions $f: X \rightarrow Y$ (e.g., non-linear functions) by learning from a large amount of input data that permits supervised, unsupervised, or semi-supervised learning. Therefore, in DRL, a set of algorithms are used to define underlying dependencies in a data and model its high-level abstractions.

Examples of neural networks include convolutional neural networks (CNNs) and recurring neural networks (RNNs). CNNs are widely used in image recognition applications, while RNNs are used when context is important, such as when decisions from past iterations or samples can influence current decisions (e.g., analysis of a word in a sentence in the context of the other words within that sentence or previous sentences). Neural network based training of autonomous systems has yielded a wide range of products which are increasing in demand as well as operational autonomy, with applications that have a correspondingly increasing impact on society in terms of safety and well-being (e.g., automated systems in healthcare, autonomous vehicles, etc.). These autonomous systems are able to engage in planning and decision-making using DRL methods. In this context, a plan is a sequence of control actions that must be executed to accomplish a predefined task with concrete initial and goal conditions. However, DRL-based methods for generation of autonomous systems plans are not guaranteed to satisfy safety and task accuracy criteria, which are critical considerations when deploying such algorithms in the wild. While a potential solution can include manually coding a set of rules that ensures the robot will perform actions in a safe manner and enforces accuracy, a manual hand-tuned rule-set might not capture all the limitations required and might over- or under-constrain the platform capabilities.

Current approaches for preventing autonomous systems from executing plans that are potentially harmful (e.g., to objects, people, the environment, or themselves) include constraining the control commands sent to a robot that can be classified depending on their position in a control stack. For example, a command sent to a robot is an immediate control action that must be executed by the robot to the best of its capabilities. It can be in the form of a target joint angle, velocity, acceleration or torque. Specific constrains that can be applied include hardware constraints, firmware constrains, and software constraints. For example, using hardware constraints, safety rules are directly implemented in hardware by mechanically limiting the torque that can be applied to robot actuators and limiting joint angles to be in a controlled range. This makes it physically impossible to violate such hardware constraints without breaking the robot, making any monitoring process unnecessary. When using firmware constrains, internal sensors encoders, electric current) are monitored, guaranteeing that their values are always in a valid range. Upon failure, the robot is brought to an emergency stale that shuts down the electric current and requires a reset process and verification. Meanwhile, implementing software constrains permits evaluation of constraints before each control command is sent to the robot, including external sensor information to determine whether a control signal is valid. In this category it is possible to implement predictive computation of the control command effects in order to prevent actions that potentially violate the established constraints. As such, constraints continue to be a set of rules that must be enforced by the application and throw exceptions that stop the robot and force a restart. Despite the implementation of such constraints, all of them have particular disadvantages. For example, while hardware limitations are implemented by robot manufacturers and are robust, these limitations are not flexible and cannot adapt to the task, the environment, and the autonomous system's current state. Firmware limits are similar to hardware constraints, such that there is improvement in flexibility but a lack of dynamic adaptation. While software constraints have the potential to overcome the limitations of the previous approaches, they are commonly implemented as a set of rules that are manually tuned for each task and do not adapt to the current state.

Example systems, apparatus, and methods disclosed herein permit formally verifiable acceptability criteria generation for autonomous systems plans. An acceptance criteria is a set of conditions that must be fulfilled by a plan or a command to be considered valid for execution, such that these criteria further meet the task goals and safety restrictions in an Operational (Safety) Domain. This approach permits a solution that offers flexibility, permits adaptation to tasks, embodiments, and environment states, and is transferrable among different robots. Specifically, example approaches proposed herein disclose a system that validates autonomous systems plans and control commands by generating a formally verifiable representation of a rule-set. A formally verifiable representation of a rule set results in several improvements to an autonomous system, including: 1) guaranteed safe execution, 2) adaptation to an embodiment, 3) adaptation to a task, and 4) consideration of contextual sensor data. As used herein, the embodiment is the physical manifestation of the autonomous system. The example approach consists of exploiting data from already running autonomous systems (e.g. a factory robot, an autonomous vehicle, etc.) to distill a set of rules through a neural encoding scheme. In the example methods, rule distillation is transferred to each task-embodiment domain via a domain adaptation mechanism and used to filter control signals incoming from planning and control modules. As such, the example approach presents a system that learns formally verifiable rules, compiled into an acceptance criteria, used to filter control commands on autonomous systems. The learning process uses historical data from automated tasks, while the learned rule generator is able to provide a set of learned rules, represented in a formal language. Furthermore, the set of rules depends on the task at hand and is adapted to each specific embodiment by a domain adaptation mechanism.

Automatic generation of acceptability criteria can have a major impact in automated industrial processes, future service robotics, and other autonomous systems. Safety is a hard requirement that systems must satisfy before commercial deployment, making the example approaches disclosed herein a valuable tool for improving robotic system safety by introducing a method of autonomous system self-learning of safety conditions for given tasks with corresponding task optimizations.

FIG. 1A is a block diagram illustrating an example environment in which an autonomous system controller used for acceptability criteria generation is implemented. In the illustrated example of FIG. 1, the example environment 100 includes an example motor driver 110, example sensor(s) 120, example sensor data storage 130, and example autonomous system controller 150. The example motor driver 110 implements instructions received from the example autonomous system controller 150, thereby translating operating system instructions into hardware system executions. The example sensor(s) 120 of the illustrated example of FIG. 1A is implemented by one or more data acquisition sensors such as, for example, one or more Light Detection and Ranging (LiDAR) sensors, image sensors, distance sensors, contact sensors, pressure sensors, navigation sensors, ultrasonic sensors, etc. In some examples, multiple different types of sensors are used. In examples disclosed herein, the sensor(s) 120 provide data to the autonomous system controller 150. The example data storage 130 is implemented by any memory, storage device and/or storage disc for storing data such as, for example, flash memory, magnetic media, optical media, solid state memory, hard drive(s), thumb drive(s), etc. Furthermore, the data stored in the example sensor data storage 130 may be in any format such as, for example, binary data, comma delimited data, tab delimited data, structured query language (SQL) structures, etc. While, in the illustrated example, the sensor data storage 130 is illustrated as a single device, the example sensor data storage 130 and/or any other data storage devices described herein may be implemented by any number and/or type(s) of memories. The example sensor data storage 130 can store sensor data (e.g., cached sensor data collected by the sensors) 120) and/or ground truth data (e.g., curated sensor data known to not include noise).

Figure 1B:
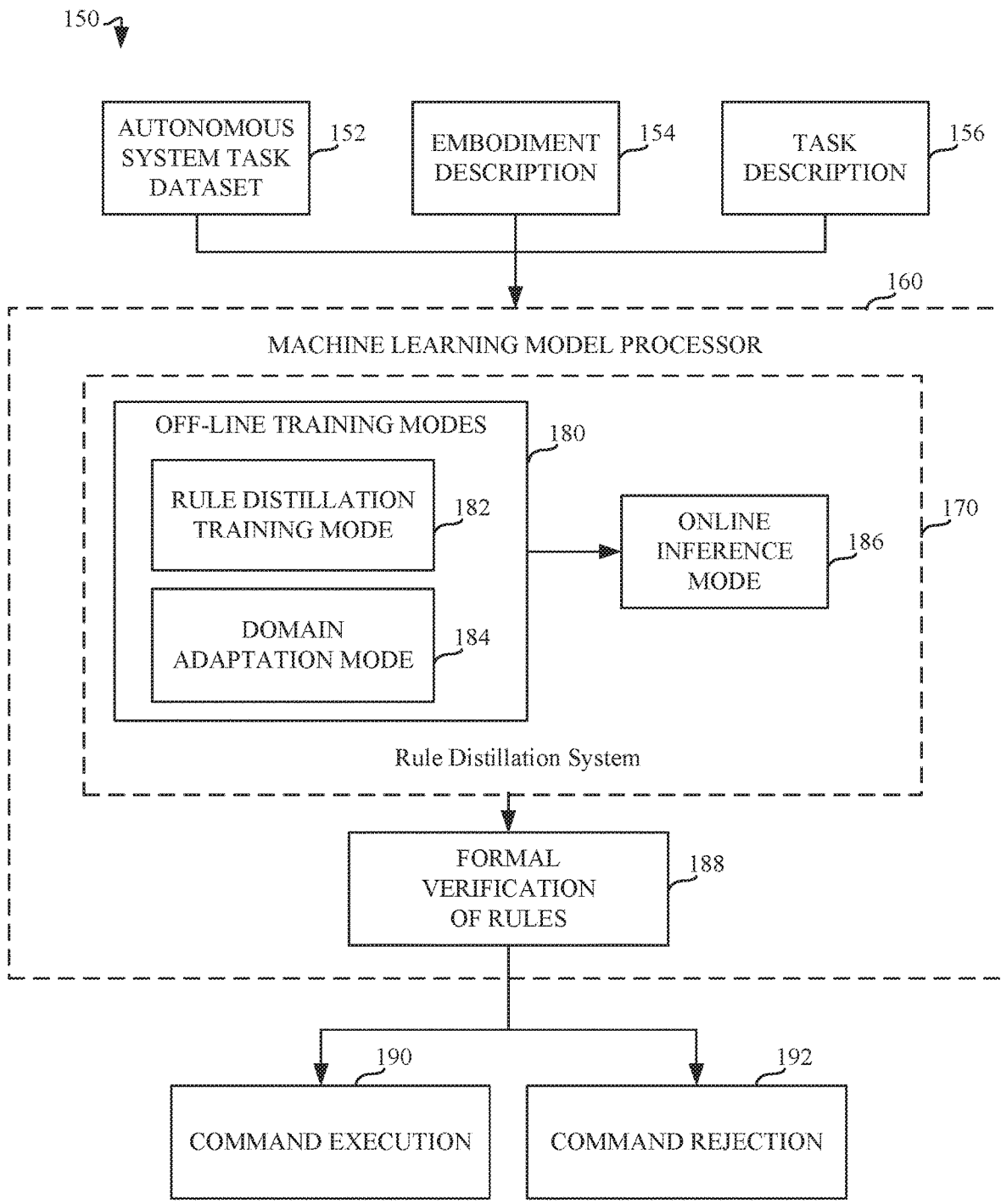
FIG. 1B is a block diagram illustrating an example autonomous system controller, constructed in accordance with teachings of this disclosure for generating acceptability criteria for autonomous systems plans.

FIG. 1B is a block diagram illustrating example autonomous system controller 150, constructed in accordance with teachings of this disclosure for generating acceptability criteria for autonomous systems plans. The example autonomous system controller 150 includes input data, including example autonomous system task dataset 152, example embodiment description 154, and example task description 156. These data sets are implemented in the example machine learning model processor 160, which includes execution of an example rule distillation system 170 and example formal verification of rules 188. The example rule distillation system 170 includes two example off-line training modes 180 and an example online training mode (e.g., example online inference mode 186). The example off-line training modes 180 include the example rule distillation training mode 182 and example domain adaptation mode 184. If a system has never been trained before, it first runs an off-line training process that permits the system to learn a general rule set generated based on annotated historical data (e.g., example rule distillation training mode 182). The trained rule distillation system is then adapted to a specific embodiment using an example self-supervised domain adaptation mode 184. If the system is just being adapted to a new robot or task, only the example domain adaptation mode 184 needs to be implemented. This permits the system to adapt the already learned acceptability criteria to a new domain. In order to determine whether a command is executed 190 or rejected 192, the example online inference mode 186 is implemented to use the robot, task and plan and produce verifiable acceptance criteria (e.g., formal verification of rules 188). Acceptance criteria implementation is flexible and can take the form of formal or programming languages (e.g., Metric Temporal Logic). Some examples of rules that form an acceptance criteria can include safety related rules (e.g., torque limits, minimum distance to obstacles, max force, etc.) and performance-related rules (distance to target, goal tolerance, maximum time, etc.). As a result, the rule set is evaluated before each command execution to determine whether the control commands are acceptable for the current state of the robot, task and environment.

Figure 2:
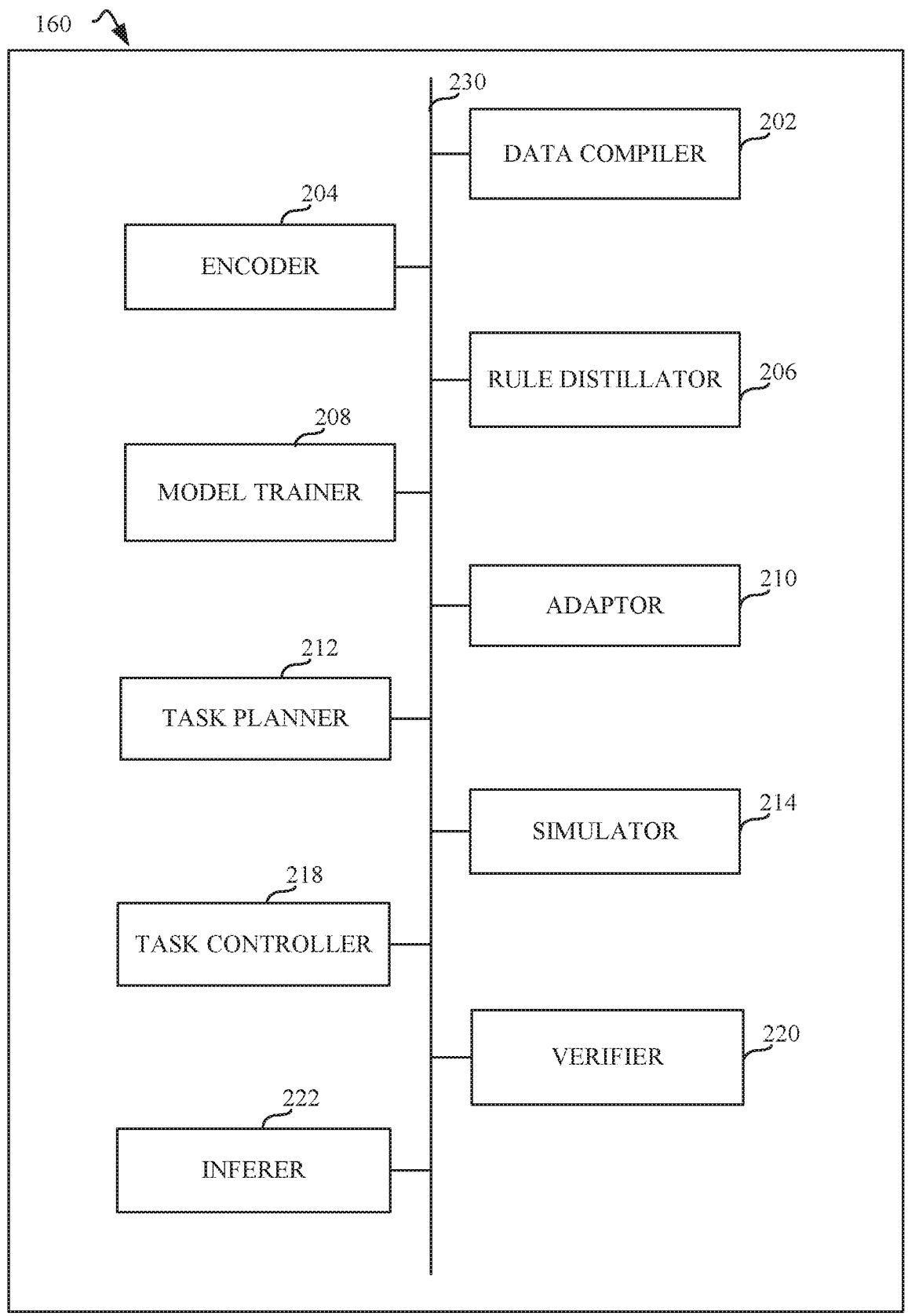
FIG. 2 is a block diagram of an example machine learning model processor constructed in accordance with teachings of this disclosure for generating acceptability criteria for autonomous systems plans.

FIG. 2 is a block diagram of an example machine learning model processor 160 constructed in accordance with teachings of this disclosure for generating acceptability criteria for autonomous systems plans. The example machine learning model processor 160 of FIG. 2 includes an example data compiler 202, an example encoder 204, an example rule distillator 206, an example model trainer 208, an example adaptor 210, an example task planner 212, an example simulator 214, an example task controller 218, an example verifier 220, and an example inferer 222, all of which can be in communication with each other using bus 230. The example data compiler 202 compiles data generated by the autonomous system into an autonomous system task dataset. For example, in order to train the system, data generated by a deployed robotic system is leveraged and compiled into an autonomous system task dataset that is organized in such a way that can be consumed by a data encoding procedure. Such a data encoding procedure is performed by the example encoder 204. The example encoder 204 transforms each data point into a representation suitable for the proposed neural network architecture that composes the rule distillation module, which is executed by the example rule distillator 206. In some examples, the rule distillator 206 includes a model trainer 208. The example rule distillator 206 engages the rule distillation training mode that permits a system that has never been trained before to be trained off-line (e.g., using a static dataset), such that the system learns a general rule set generated based on expert annotated historical data. The example model trainer 208 trains the example rule distillator 206 until training is complete. The completion of the training process is determined by a cost function convergence. When a cost function has converged, or is minimized, the system has "learned" to estimate a relationship between X and Y, such as in terms of the difference or distance between a predicted value and an actual value. As such, the cost function is estimated by iteratively running the model to compare estimated predictions against a "ground truth rule set", Which is representative of the known values of Y. Therefore, the example model trainer 208 continues the iteration until the cost function is minimized.

Once the example rule distillation training mode 182 is complete, the example adaptor 210 adapts the trained rule distillation to a specific embodiment by using a self-supervised process that is trained using synthetic data from a simulated environment. This step of the training process requires the example adaptor 210 to engage the example task planner 212, the example simulator 214, and the example sensor(s) 120. For example, the embodiment to which the rule distillation is adapted using the adaptor 210 is introduced into the task planner 212. While the example task planner 212 generates a sequence of control commands $<C_i>$, the example simulator 214 generates corresponding sensor values $<S_i>$ that are obtained from the sensor(s) 120. The example encoder 204 encodes the generated data, as is performed in the example rule distillation training mode 182. Using this input, the rule distillation neural network architecture is adapted to the new domain in an unsupervised learning fashion. Once again, the example model trainer 208 is engaged to determine when the neural network training process is complete, which is indicative of the network being adapted to the new domain (e.g., example domain adaptation mode 184), thereby producing a domain adapted rule distillation module which is also trained offline (e.g., example online inference mode 186). Unlike the example task planner 212, the example task controller 118 is used in a standard robot perceive-plan-act control loop to output control commands and receive input on whether a task has been completed. The example approach integrates the acceptability criteria generation system into a standard perceive-plan-act control loop to enhance the safety and performance of the autonomous system.

Once the autonomous system has been completely trained using the example rule distillation training mode 182 and the example domain adaptation mode 184, the example inferer 222 initiates the example online inference mode 186, which uses the robot, task and plan data to produce verifiable acceptance criteria. Given that the example inference mode 186 is trained online, the data comes in as the system is engaged in training as opposed to using a static data set. The example verifier 220 is used to generate the verifiable acceptance criteria, while the example inferer 222 further evaluates a control command to determine whether the command is accepted or rejected (e.g., example command execution 190, example command rejection 192).

While an example manner of implementing the autonomous system controller 150 for generating acceptability criteria for autonomous systems plans is illustrated in FIGS. 1A, 1B, and 2, one or more of the elements, processes and/or devices illustrated in FIGS. 1A, 1B, and 2 may be combined, divided, re-arranged, omitted, eliminated and/or implemented in any other way. Further, the example data compiler 202, the example encoder 204, the example rule distillator 206, the example model trainer 208, the example adaptor 210, the example task planner 212, the example simulator 214, the example task controller 218, the example verifier 220, the example inferer 222, and/or, more generally, the example machine learning model processor 160 of FIG. 2 may be implemented by hardware, software, firmware and/or any combination of hardware, software and/or firmware. Thus, for example, any of the example data compiler 202, the example encoder 204, the example rule distillator 206, the example model trainer 208, the example adaptor 210, the example task planner the example simulator 214, the example task controller 218, the example verifier 220, the example inferer 222, and/or, more generally, the example machine learning model processor 160 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example data compiler 202, the example encoder 204, the example rule distillator 206, the example model trainer 208, the example adaptor 210, the example task planner 212, the example simulator 214, the example task controller 218, the example verifier 220, and/or the example inferer 222 is/are hereby expressly defined to include a non-transitory computer readable storage device or storage disk such as a memory, a digital versatile disk (DVD), a compact disk (CD), a Blu-ray disk, etc. including the software and/or firmware. Further still, the example machine learning model processor 160 for generating verifiable acceptability criteria for autonomous systems plans of FIG. 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the processor 160 of FIG. 2 is shown in FIG. 3-9. The machine readable instructions may be an executable program or portion of an executable program for execution by a computer processor such as the processor 1006 shown in the example processor platform 1000 discussed below in connection with FIG. 10. The program may be embodied in software stored on a non-transitory computer readable storage medium such as a CD-ROM, a floppy disk, a hard drive, a DVD, a Blu-ray disk, or a memory associated the processor 1006, but the entire program and/or parts thereof could alternatively be executed by a device other than the processor 1006 and/or embodied in firmware or dedicated hardware. Further, although the example program is described with reference to the flowcharts illustrated in FIG. 3-9, many other methods of implementing the example system 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIG. 3-9 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory, and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Figure 3:
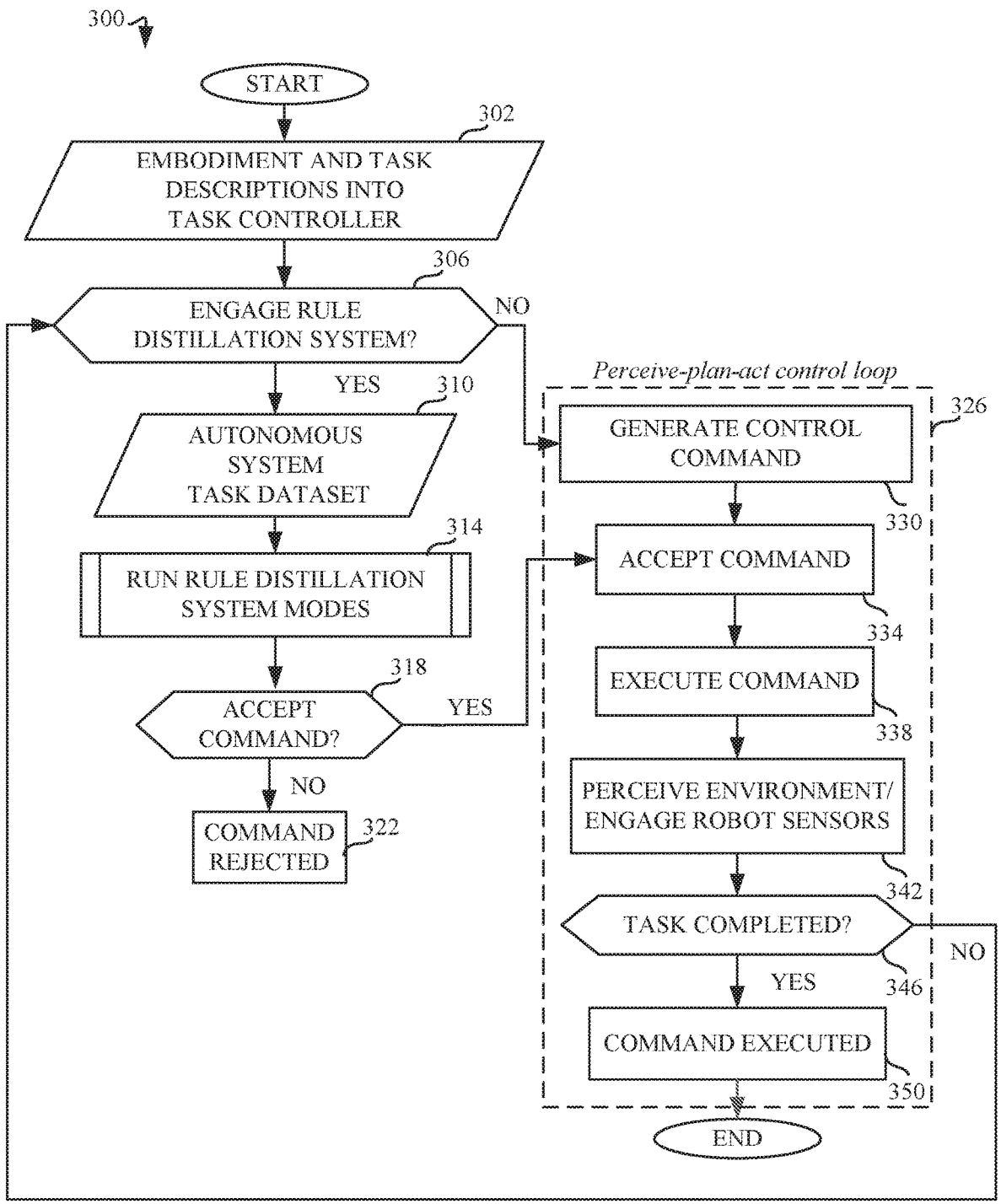
FIG. 3 is a flow chart representative of machine readable instructions which may be executed to implement elements of the example autonomous system controller of FIG. 1B, the flow chart representative of an example formally verifiable acceptability criteria generation system integrated into a robot perceive-plan-act control loop.

FIG. 3 is a flow chart 300 representative of machine readable instructions which may be executed to implement elements of the example autonomous system controller of FIG. 1B, the flow chart representative of an example formally verifiable acceptability criteria generation system integrated into a robot perceive-plan-act control loop. The example task controller 218 of FIG. 2 receives the embodiment and task description inputs associated with the autonomous system (block 302). In a standard robot perceive-plan-act loop, the task description and embodiment description inputs are provided to the example robot task controller 218 without use of the rule distillation system modes e.g., off-line and online training modes). As such, the example rule distillation system 170 is not engaged (block 306) and the system proceeds to the perceive-plan-act control loop (block 326). The example task controller 218 then generates a control command (block 330), the autonomous system controller 150 accepts the command (block 334), the autonomous system controller 150 executes the command (block 338), and the autonomous system controller 150 proceeds to perceive the environment and engage robot sensor(s) 120 to complete the task (block 342). If the task controller 218 completes the task (block 346), the command is deemed successfully executed (block 350). If the task is not completed, this information is communicated back to the robot task controller 218, which proceeds to receive updated task description and embodiment description inputs (block 302). However, using the proposed automatic formally verifiable acceptability criteria generation system (e.g., machine learning model processor 160) integrated into the example robot perceive-plan-act control loop 326, the system instead engages the example rule distillation system 170 (block 306), resulting in the generation of acceptability criteria which can be used by the system to determine if it should or should not execute the control command. For example, the rule distillation system 170 receives as input an autonomous system task dataset (block 310), such that this input is in addition to the embodiment description 154 and task description 156 received earlier (block 302). The example data compiler 202 compiles the example autonomous system task dataset 152 based on data generated by the autonomous system. The example autonomous system controller 150 engages the example rule distillation system 170, resulting in the application of the example off-line training modes 180 (e.g., example rule distillation training mode 182 and example domain adaptation mode 184), followed by the example online inference mode 186. Once the example rule distillation system 170 has generated verifiable acceptability criteria, these criteria are used by the example autonomous system controller 150 to either accept the control command (block 318), or reject the command (block 322). If the command is accepted, the autonomous system controller 150 proceeds to execute the command (block 338), followed by steps typically taken by the example robot perceive-plan-act control loop 326, which include: perceiving the environment/engaging example robot sensor(s) 120 (block 342), determining whether the control command task is completed (block 346). If the example autonomous system controller 150 deems the task not completed (block 346), the example system controller 150 receives further autonomous system-based data input (e.g., the example embodiment description 154 and the example task description 156) to the example task controller 218 prior to determining whether to engage the example rule distillation system 170.

Figure 4:
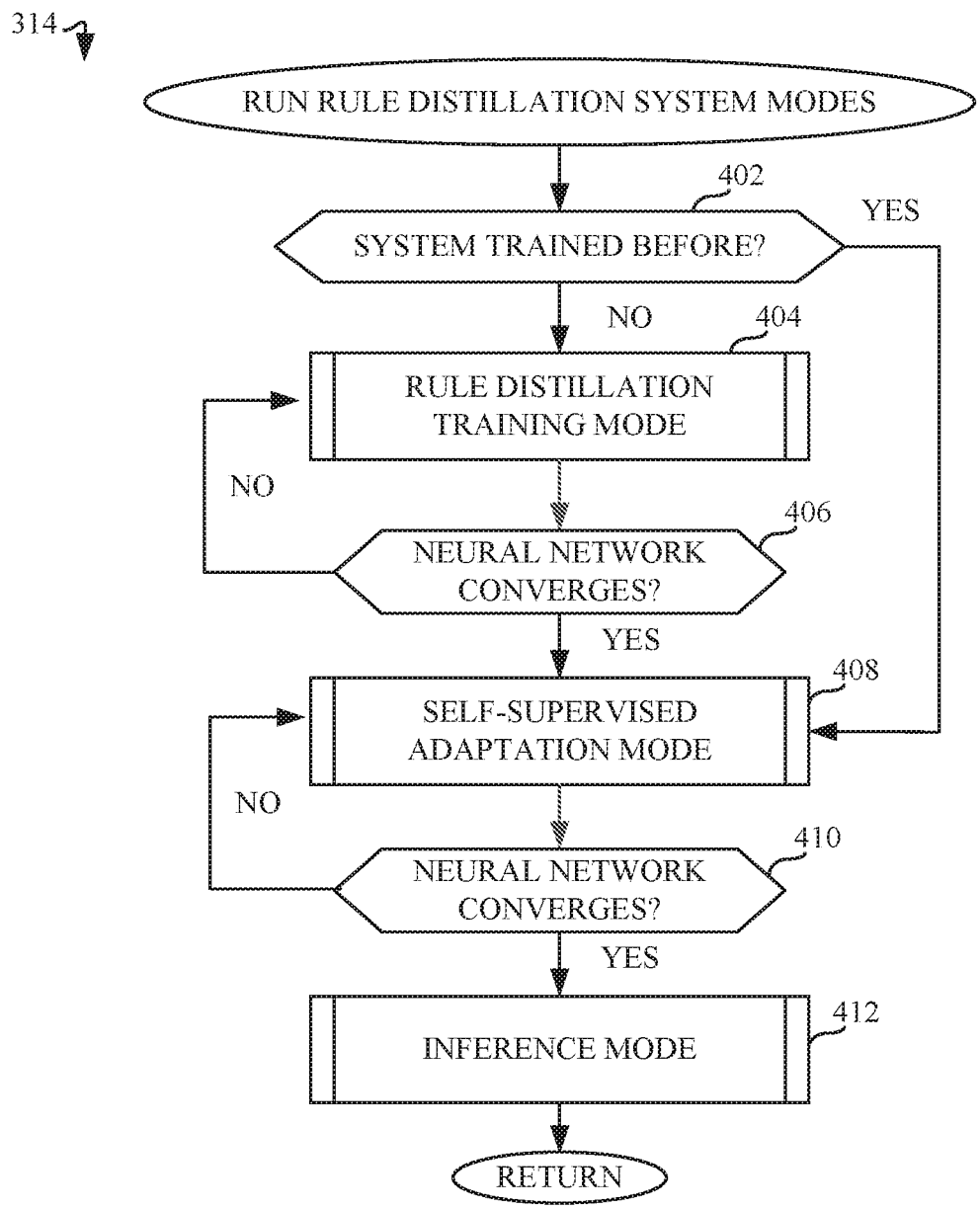
FIG. 4 is a flowchart representative of machine readable instructions which may be executed to implement elements of the example machine learning model processor of FIG. 2, the flow chart representative of an example rule distillation system mode.

FIG. 4 is a flowchart representative of machine readable instructions which may be executed to implement elements of the example machine learning model processor 160 of FIG. 2, the flow chart representative of example rule distillation system 170 modes. In order to execute the example rule distillation system 170 modes at block 314 of FIG. 3, and assuming that the system has not been previously trained (e.g., confirmed at block 402 of FIG. 4), the example machine learning model processor 160 proceeds to the example rule distillation training mode 182 (block 404), as described in further detail below in connection with FIG. 5. In the event that the example machine learning model processor 160 determines that the example rule distillation system 170 is already trained (block 402), the processor 160 engages the example self-supervised domain adaptation mode 184 (block 408), as described in further detail below in connection with FIG. 6. In order to proceed from one training mode to the next, the neural network used as part of the training process needs to converge, as determined by minimizing a cost function, as described in further detail below in connection with FIG. 5. The example machine learning model processor 160 determines if the example rule distillation training mode 182 is completed based on cost function convergence (block 406). If the training is completed, the example machine learning model processor 160 engages and trains the example self-supervised domain adaptation mode 184 (block 408) until the example processor 160 again determines that the neural network has converged (block 410). Such a process is iterative and requires continuous learning and training to minimize the cost function associated with the example off-line training modes 180 (e.g., rule distillation training mode 182 and domain adaptation mode 184). Once the off-line training modes are completed, the example rule distillation system 170 engages the example online inference mode 186 (block 412), resulting in the generation of formally verifiable acceptance criteria used to accept or reject a command (e.g., acceptance or rejection of command at blocks 318 and 322, respectively, of FIG. 3), as described in further detail below in connection with FIG. 7.

Figure 5:
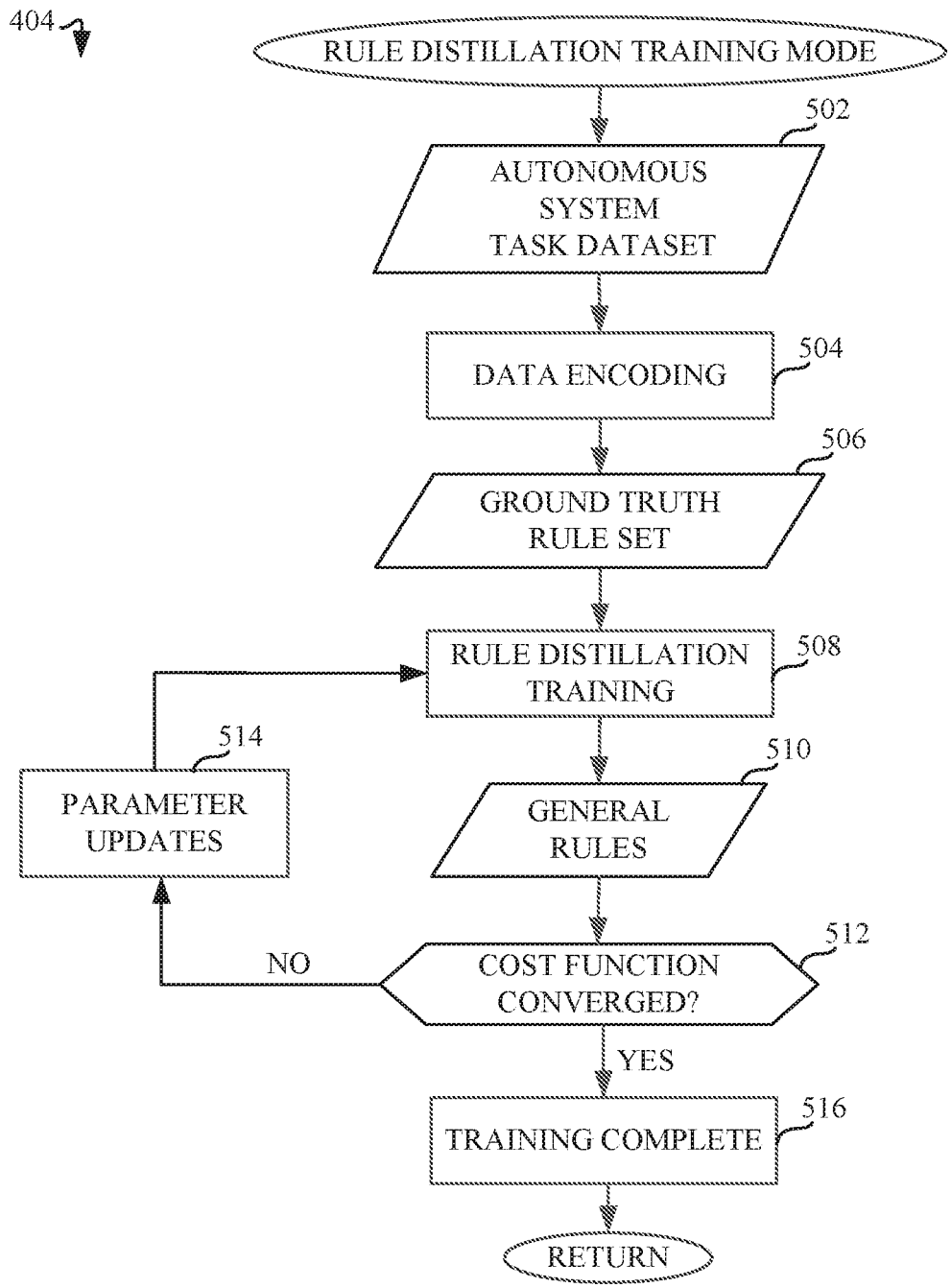
FIG. 5 is a flowchart representative of machine readable instructions which may be executed to implement elements of the example machine learning model processor of FIG. 2, the flow chart representative of an example rule distillation training mode.

FIG. 5 is a flowchart representative of machine readable instructions which may be executed to implement elements of the example machine learning model processor of FIG. 2, the flow chart representative of an example rule distillation training mode 182. In order to train the example rule distillation system 170, the example machine learning model processor 160 engages the example rule distillation training mode 182 (block 404 of FIG. 4) using the example autonomous system task dataset 152 input (block 502). This process leverages data generated by a deployed robotic system, allowing the example data compiler 202 to compile data generated by the example autonomous system controller 150 into the example autonomous system task dataset 152. The example encoder 204 encodes this input data using a data encoding procedure (block 504). The data encoding transforms each data point into a representation suitable for the proposed neural network architecture that composes the example rule distillation training mode 182. In the process, the example rule distillation training mode 182 outputs a ground truth rule set which is representative of the known values (e.g., known values of Y in a non-linear function $f$: $X \rightarrow Y$) used during the example rule distillation training mode 182 (block 506). The ground truth rule set is generated based on the example autonomous system task dataset 152. The example rule distillator 206 of FIG. 2 obtains the ground truth rule set, as well as the encoded autonomous system task dataset 152 (e.g. encoded at block 504). The example model trainer 208 trains the rule distillation neural network architecture (block 508). As a result of the training process, the example rule distillator 206 outputs a general rule set (block 510), used by the example model trainer 208 as input into the cost function to determine when the training is complete (e.g., once the cost function has converged). The cost function receives as input not only the general rule set, but also the ground truth rule set, such that the general rule set (e.g., estimated prediction) is compared to the ground truth rule set (e.g., representative of the known values). If the example rule distillator 206 determines that the cost function has converged (block 512), the example rule distillation training mode 182 is complete. Otherwise, the example model trainer 208 continues to iterate through the training process until the cost function is minimized (block 512). Minimizing the cost function involves the example rule distillator 206 updating parameters (block 514), which return to the rule distillation training (block 508) to continue the iterative process until the cost function is minimized and training of the example rule distillation module 182 completes. As such, the training process consists of the iterative optimization of the provided rule distillation cost function (block 512). The training process is checked for convergence to determine when the training process is complete (block 516).

While the objective of the example rule distillation system 170 network is expected to be the same at inference time e.g., during example online inference mode 186), there could be differences in the example embodiment description 154 or example task description 156. In practice, such differences may lead to a change of the distribution of the input data domain and may harm the example rule distillation system 170 network effectiveness. Namely, input to the network that is of the same style (e.g., embodiment, task, etc.) with a similar, but not exactly the same, distribution may not produce the best results. Therefore, the example machine learning model processor 160 engages the example self-supervised domain adaptation mode 184 (block 408 of FIG. 4).

Figure 6:
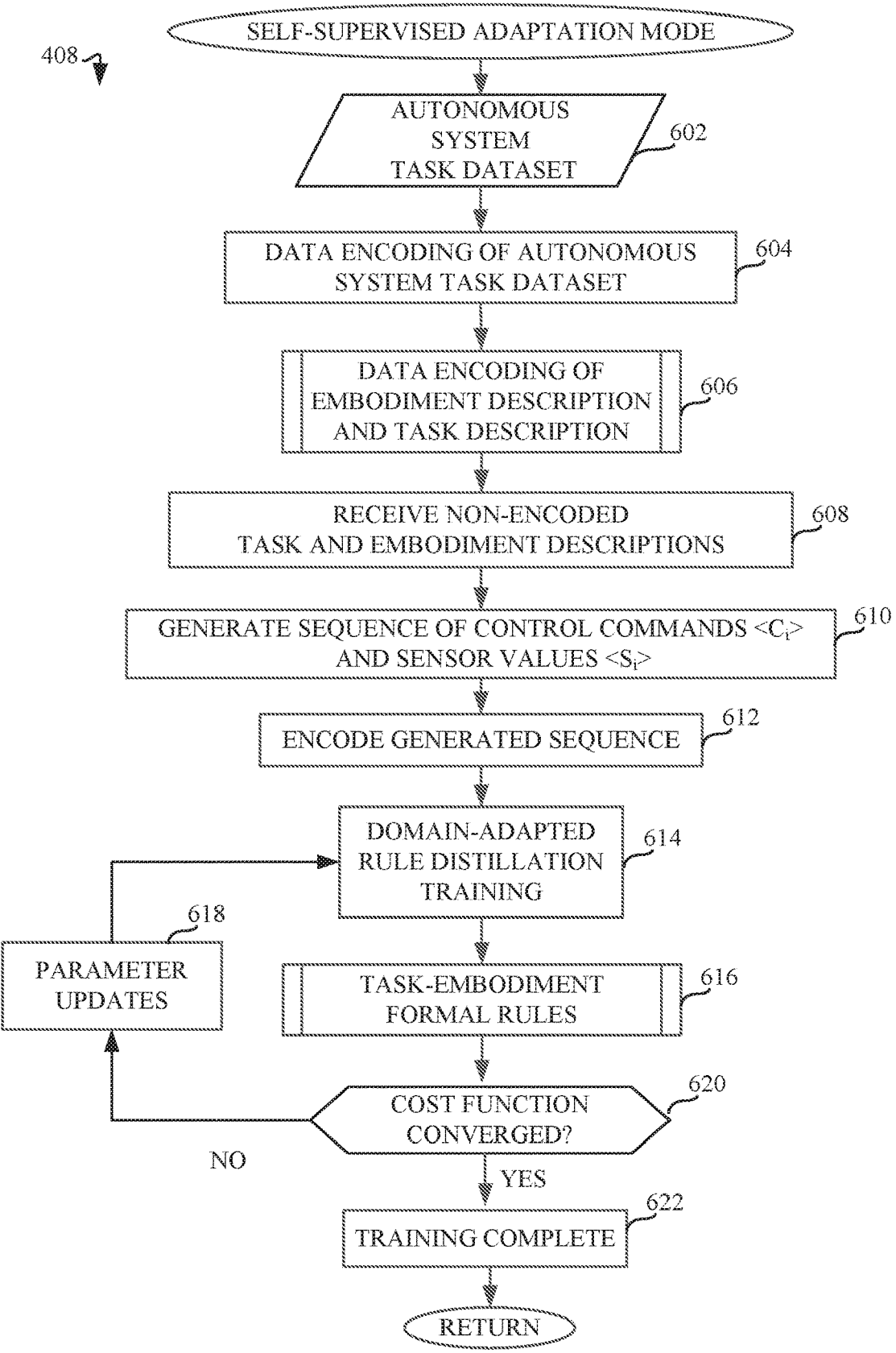
FIG. 6 is a flowchart representative of machine readable instructions which may be executed to implement elements of the machine learning model processor of FIG. 2, the flow chart representative of an example self-supervised adaptation mode.

FIG. 6 is a flowchart representative of machine readable instructions which may be executed to implement elements of the machine learning model processor of FIG. 2, the flow chart representative of an example self-supervised domain adaptation mode 184. The example domain adaptation mode 184 receives as input the example autonomous system task dataset 152 (block 602). The example encoder 204 of FIG. 2 encodes the task dataset (block 604). Additionally, the example task planner 212 receives the example embodiment description 154 and the example task description 156. In addition to encoding the example autonomous system task dataset 152 (block 604), the example encoder 204 also encodes the example embodiment description 154 and example task description (block 606), as described in further detail below in connection with FIG. 8. The example adaptor 210 receives non-encoded task and embodiment descriptions (block 608) to generate a sequence of control commands and sensor values (block 610). The example task planner 212 uses the example simulator 214 to create a simulated environment to generate the sequence of control commands <$C_i$> with their corresponding sensor values <$S_i$>. The example encoder 204 encodes the generated sequence (block 612). The example adaptor 210 uses this encoded data (block 612) to adapt the rule distillation neural network architecture to a new domain using unsupervised learning as part of the example domain-adapted rule distillation training (block 614). This training process, performed using the example model trainer 208, follows the basics of the off-line training described in FIG. 5 with modifications to the network architecture and the use of a domain adaptation cost function. The autonomous system task dataset input (block 602) is essential to train the modified architecture. The domain-adapted rule distillation training (block 614) output consists of the task-embodiment formal rules (block 616), as described in further detail below in connection with FIG. 9. This is determined using, as in the example rule distillation training mode 182 of FIG. 5, a cost function to track when the cost function converges (block 620) so as to identify the completion of the training process (block 622). When the cost function is not yet minimized, the example adaptor 210 promotes parameter updates (block 618) to continue the iterative training process until the domain-adapted rule distillation training is complete (e.g., cost function is converged (block 620)).

Figure 7:
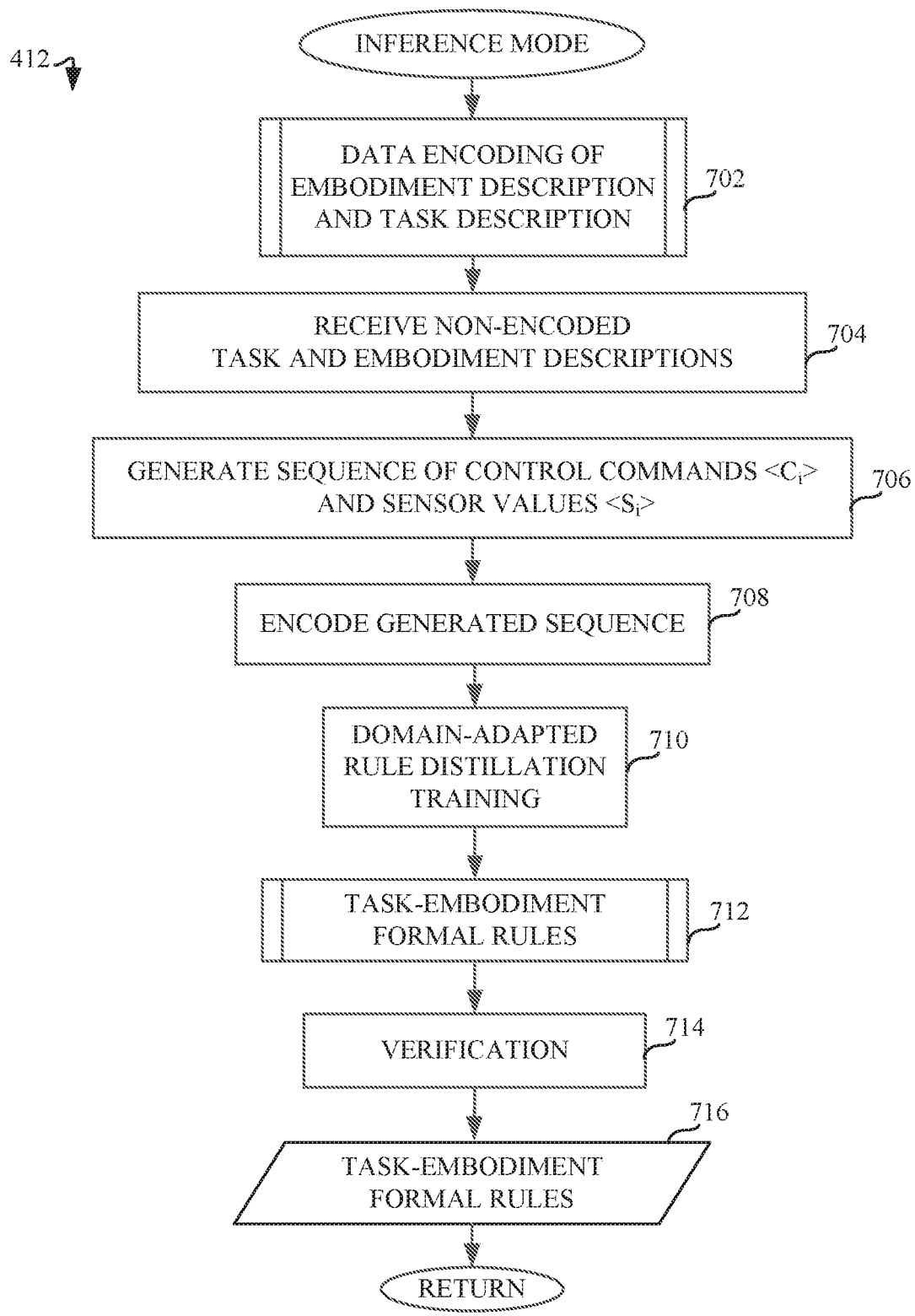
FIG. 7 is a flowchart representative of machine readable instructions which may be executed to implement elements of machine learning model processor of FIG. 2, the flow chart representative of an example inference mode.

FIG. 7 is a flowchart representative of machine readable instructions which may be executed to implement elements of machine learning model processor of FIG. 2, the flow chart representative of an example online inference mode 186. The example online inference mode 186 determines whether to accept a control command or reject it. The example formal verification of rules 188 evaluates control commands using verified acceptability criteria generated for a specific embodiment, a task, a sensed state and a control command. The rule set is generated for each command and sensed state, such that the domain-adapted rule distillation is evaluated before each command is executed. Therefore, data required to generate the rule set needs to be provided at each iteration of the control loop (e.g., perceive-plan-act control loop). In some examples, embodiment and task information are provided by the setup and the task description, which are constant throughout the execution of a task. However, control and sensor data must be updated at each iteration of the control loop. For example, the task planner 212 provides a control sequence to the example simulator 124. The simulator 214 generates synthetic sensor data associated with each control command that has not yet been executed. This generative process provides the tuple finite ordered list) required by the example encoder 204 to transform input data to a representation suitable for domain-adapted rule distillation to be performed using the example domain adaptation mode 184 of the machine learning model processor 160. Therefore, the example online inference mode 186 also relies on the use of the input of the example embodiment description 154 and the example task description 156 encoded by the example encoder 204 (block 702), as described in further detail below in connection with FIG. 8. Furthermore, the example inferer 222 receives non-encoded task and embodiment descriptions (block 704). The example task planner 212, the example simulator 214, and the example sensors) 120 generate control commands and sensor values (block 706). The example encoder 204 encodes the generated sequence of control commands and sensor values (block 708). Once the example domain-adapted rule distillation training (e.g., using the example domain adaptation mode 184) is completed (block 710), the example adaptor 210 generates task-embodiment formal rules (block 712) for the example verifier 220 to perform formal verification (block 714), as described in further detail below in connection with FIG. 9. The example verifier 220 outputs the task-embodiment formal rules (block 716), which the example inferer 222, overseeing the example inference mode 186 training process, uses to evaluate a control command, the evaluation resulting in an acceptance or rejection of the command (e.g., command execution and rejection blocks 190 and 192 of FIG. 1B).

In some examples, the example verifier 220 of FIG. 2 performs verification (block 714) to calculate a correctness measure of a generated rule-based specification. In some examples, this formal verification process can include the use of a robustness function of Metric Temporal Logic requirements, which involves the reactive, spatio-temporal requirements of an autonomous system task. For example, the requirements are specified in a formal mathematical language for writing temporal specifications, such as formula $\varphi$ of example Equation 1 which is composed of a finite set of propositional variables (p), logical operators (NOT ($\neg$), OR ($\lor$), AND ($\land$)) and temporal modal operators (U, S):

$$\varphi: =T|p|\neg p|\varphi_1 \lor \varphi_2|\varphi_1 \land \varphi_2|\varphi_1 U_I \varphi_2|\varphi_1 S_I \varphi_2 \qquad \text{Equation 1}$$

An example of an application of Equation 1 can include a model M of an autonomous system task under verification. For example, the model M is checked for correctness and $\varphi$ defines a proposition that a selected state (e.g., example state S3) always generates an action that falls to another state (e.g., example state SI). For example, such a state could be a requirement for an emergency stop in an industrial robot or an automated vehicle (e.g., if (lead car slows down) $\land$ (separation <15 meters), the vehicle brakes). Therefore, the formal verification of an initial set of conditions ($X_0$) involves checking whether there exists a plan satisfying the counter-example $\neg \varphi$. An automatic correctness tool can then be used to apply a reachability analysis during the training period. In some examples, where reachability analysis has long run times, computational efficiency is determined using a robustness, $\rho_\phi(x)$, of an execution plan (x). The robustness of the execution plan is a real number that measures whether x satisfies the rule (e.g., $\rho_{99}$ (x) >0) or whether it violates it (e.g., $\rho_\phi(x)$ <0). The plan can also be disturbed by an amount (e.g., $|\phi(x)|$) without changing its true value (e.g., accomplishing an intended goal). Therefore, if $\rho_\phi(x_1) > \rho_\phi(x_2) > 0$, this indicates that $x_1$ is more robustly correct than $x_2$ since it can sustain a greater disturbance without violating the rule. During run time, the example verifier 220 continuously measures plan robustness to determine constraints towards the learned rules.

Figure 8:
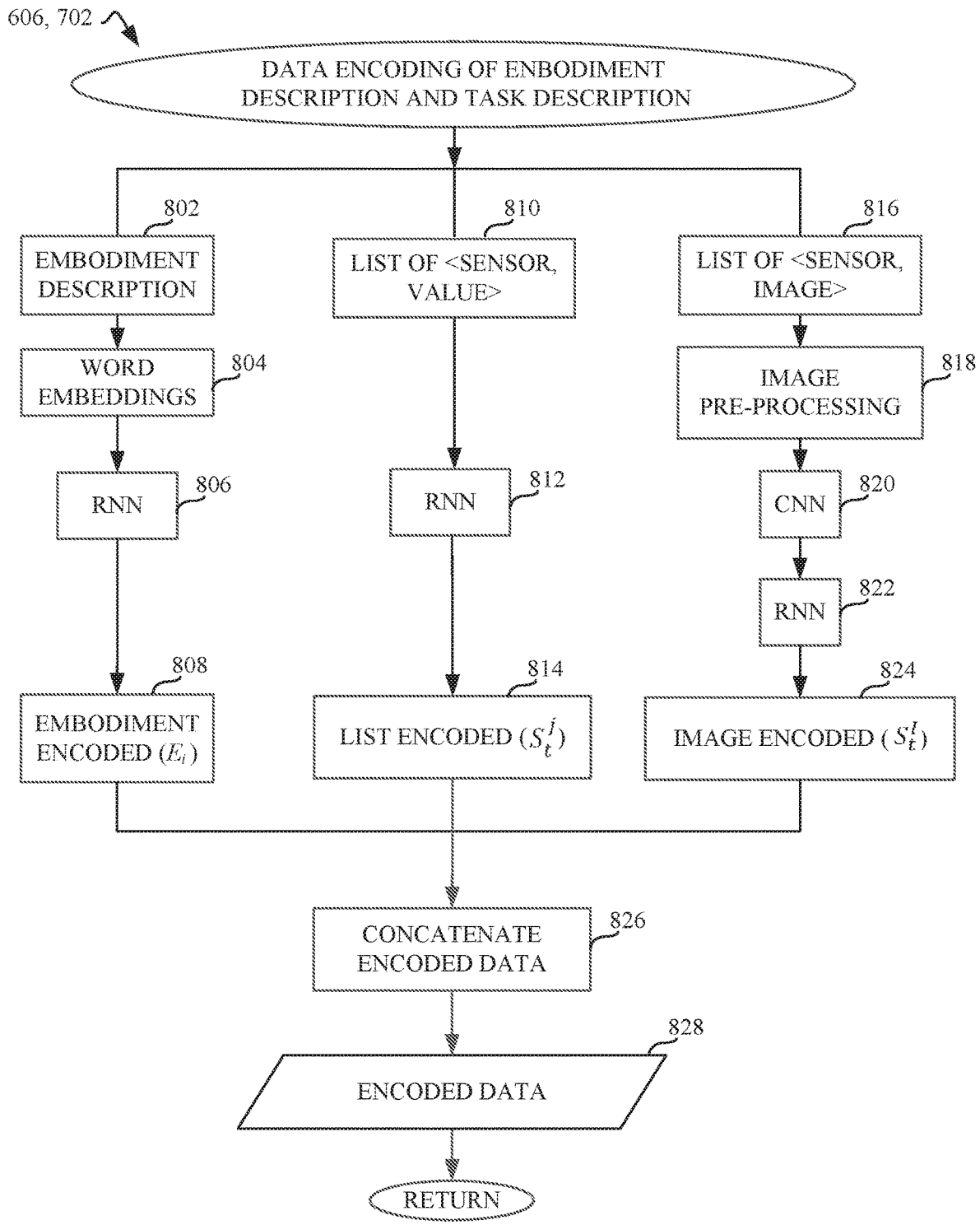
FIG. 8 is a flowchart representative of machine readable instructions which may be executed to implement elements of machine learning model processor of FIG. 2, the flow chart representative of an example data encoding on an embodiment description and a task description.

FIG. 8 is a flowchart representative of machine readable instructions which may be executed to implement elements of machine learning model processor of FIG. 2, the flow chart representative of an example data encoding of an example embodiment description 154 and an example task description 156. The example encoder 204 of FIG. 2 encodes the example embodiment description (block 802), a list of <sensor, value>(block 810), and a list of <sensor, image> (block 816). The encoding of these parameters is performed as part of the example self-supervised domain adaptation mode 184 described in FIG. 6 and the example online inference mode 186 described in FIG. 7. Specifically, these encoded inputs are needed by the example model trainer 208 to train a dataset, such as the example dataset D of Equation 2:

$$D_i = \{E_i; \{T_i^k\} k:1 \ldots M_i; <C_t^i, S_t^i>_{t:1} \ldots N_i; y_i\}_i \quad \text{Equation 2}$$

In the example Equation 2, $E_i$ denotes a specific embodiment description in a markup language (e.g., Syntax Definition Formalism (SDF) or Universal Robotic Description Format (URDF)). $\{T_i^k\}$ represents a task $T_i$, composed by a set of M possible final configurations. In example Equation 2, the sequence $<C_t^i, S_t^i>t: 1 \ldots N_i$ corresponds to the control signals $C_t^j$ and sensor values $S_t^j$ that were recorded during execution of a task ($T_i$) on the embodiment ($E_i$) captured at time, t. In example Equation 2, the label $y_i$ of each data point consists of a list of acceptable rules. For example, each data point is annotated with a set of valid rules. In some examples, this information can be obtained by a third-party system that automatically extracts such rules from an imitation learning approach. In order to use the dataset to train an automatic rule generator, a pre-processing step that converts data points to an encoded fixed-size representation suitable for a neural network framework is needed. Therefore, the example encoder 204 encodes the example embodiment description 802 and corresponding sequences (blocks 810 and 816).

During the example domain adaptation mode 184 and the example online inference mode 186, the encoded embodiment description $E_i$ and the encoded task description $\{T_i^k\}_{k:1 \ldots M_i}$ are used by the example adaptor 210 and the example verifier 220 to generate task-embodiment formal rules. In some examples, while the embodiment description 802 is obtained from the robot manufacturer, the task description is user-defined as a set of valid final configurations. Furthermore, the example task planner 212, which is used in the example domain adaptation mode 184 and the example online inference mode 186, implements logic that generates a sequence of commands $<C_t^i>_{t:1 \ldots T}$ that convert the current state into any of the valid goal states of the task given the provided environment. In some examples, the simulator 214, also implemented during the example domain adaptation mode 184 and the example online inference mode 186, generates synthetic sensor data obtained from executing a plan in the real robot (e.g., using simulation software such as Gazebo, MuJoCo, V-REP, etc.). Simulators such as the example simulator 214 can natively support markup language (e.g., URDF and SDF) robot descriptions. The example sensor(s) 120 is therefore able to generate sensor data ($S_t^i$) after the execution of control commands ($C_t^i$) to yield the sequence of commands and sensor data $<C_t^i, S_t^i>_{t:1 \ldots T}$.

Different robots can have different possibilities to interact with their environment, as well as different sensors to perceive the environment. This is taken into account by using the robot description as part of the training dataset (e.g., the embodiment description 154). However, obtaining a valid representation for an embodiment requires pre-processing. In some examples, taking as input any of the markup languages that are prominent in the robotics community (e.g. URDF, SDP, COLLADA), the example encoder 204 uses word embedding to encode the text into a numeric representation (block 804). In some examples, the example rule distillation system 170 trains a recurrent neural network (RNN), the RNN processes the embedded platform representation (block 806) to produce an encoded representation (block 808).

In addition to the embodiment description 802 encoding, the example encoder 204 also encodes a sensorimotor plan representation. Each data point contains, for each example task and embodiment, a sequence of control actions taken and the sensor data recorded (e.g., using the example sensor(s) 120). In some examples, the recorded data is transformed to a stacked representation to be used by the example rule distillation system network 170. For example, the encoded representation is computed by separating sensor data into two categories: (1) unidimensional sensor values and (2) multi-dimensional sensor values. The example encoder 204 processes unidimensional sensor values as a sequence of pairs (e.g., <sensor id, value>) (block 810), and feeds this sequence into a RNN (block 812) to generate an encoding corresponding to this data (block 814). For example, control actions can be considered as unidimensional sensor values. Multi-dimensional values (e.g., <sensor, image>) (block 816) are first preprocessed using the example encoder 204 to normalize their dimensions and value ranges (block 818). In some examples, the encoder 204 feeds normalized sensor values to a pre-trained convolutional neural network (CNN) model (block 820). In some examples, the encoder 204 uses the CNN to extract deep features used by a RNN (e.g., neural network trained together with the rule distillation system 170) (block 822) to generate an encoding corresponding to this sensor data (block 824). Each of these inputs are encoded separately and concatenated (block 826), after the encoding process is complete, to yield an encoded data output (block 828). In some examples, such a procedure for sensor encoding can also be used to complete valid sensor configuration encoding for task representation encoding, since a task is represented by a set of valid final sensor inputs after executing a sequence of commands. For example, if the task consists of stacking two blocks, it can be represented by a set of sensor signals perceiving where the blocks are on top of each other. As such, valid configurations can include different relative positions and orientations.

Figure 9:
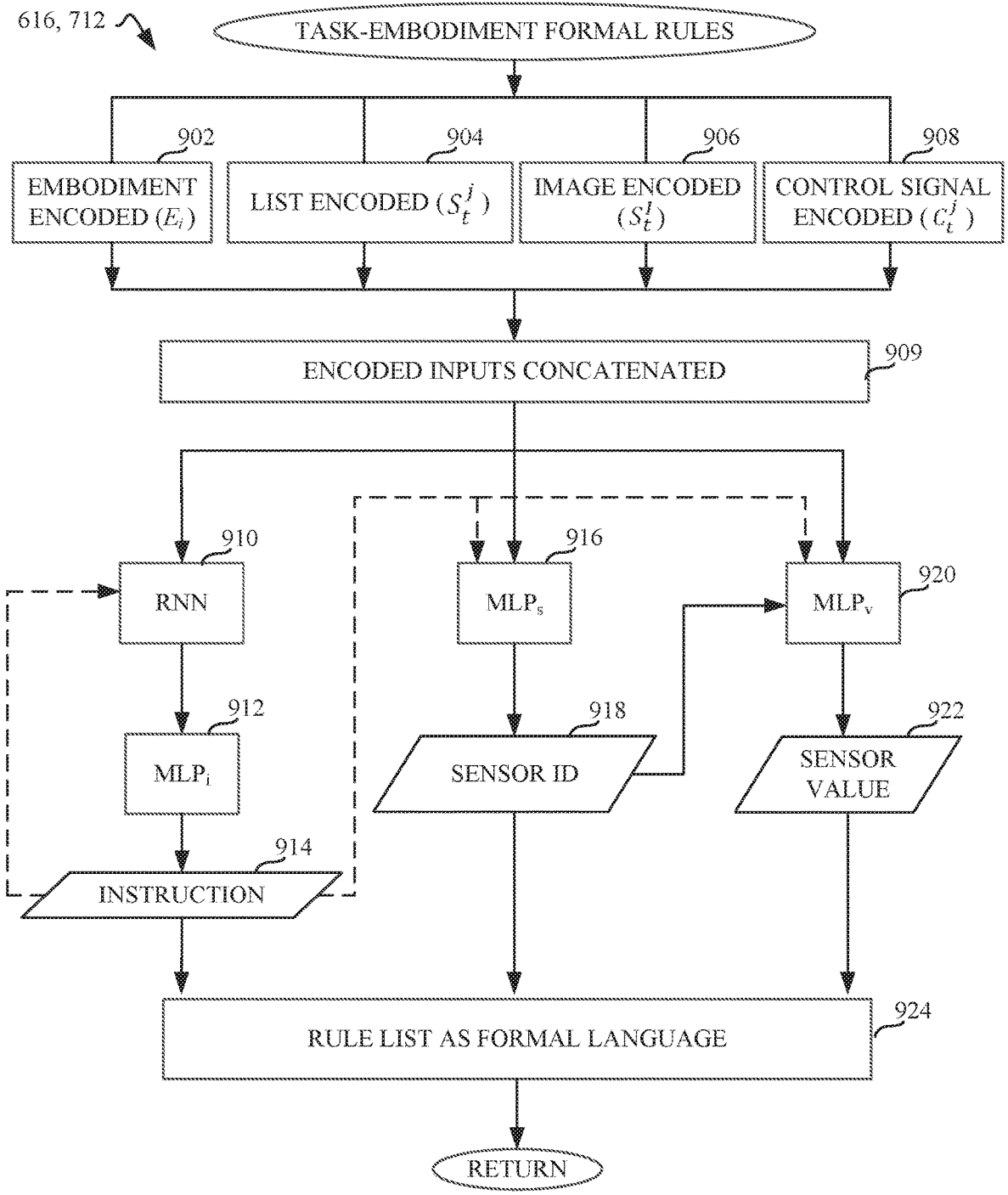
FIG. 9 is a flowchart representative of machine readable instructions which may be executed to implement elements of machine learning model processor of FIG. 2, the flow chart representative of example task embodiment formal rules.

FIG. 9 is a flowchart representative of machine readable instructions which may be executed to implement elements of the example machine learning model processor of FIG. 2, the flow chart representative of task embodiment formal rules. The example verifier 220 generates task embodiment formal rules. The rules are generated based on a number of inputs, including the encoded embodiment ($E_t$) (block 902), encoded list ($S_t^j$) (block 904), encoded image ($S_t^i$) (block 906), and encoded control signal ($C_t^j$) (block 908). The example machine learning model processor 160 uses the encoded data samples to train the rule distillation network architecture. For example, the encoder 204 concatenates the encoded inputs (block 909) and feeds the inputs to the RNN (block 910) to generate logic rule statements, used as the skeleton of the resulting rule set. The example rule distillation system 170 uses the RNN to output a hidden state that is converted by a MultiLayer Perceptron (MLP) (e.g., MLP) with a softmax output to a distribution over the possible statements (block 912). In some examples, this categorical distribution is sampled to obtain an actual rule statement (block 914). However, in some examples, the rules may contain parameters that cannot be generated by the $MLP_i$. Instead, the required rule parameters are produced by $MLP_s$ and $MLP_v$, which generate the needed values. For example, the $MLP_s$, (block 916) is an MLP (with a softmax output) that, given the rule statement and encoded data, outputs a sensor ID for the rule statement (block 918). The $MLP_v$ is art MLP as well (block 920), but outputs general values, such as the sensors value outputs (block 922). This information completes each rule statement generated from the RNN. In some examples, additional rules can be produced by feeding the last statement as input to the RNN. For example, the RNN is initialized with a <START> rule statement, and the process finishes when the <STOP> rule statement is output from the $MLP_i$ (block 912). All the produced rule statements form a rule list (block 924) to be formally verified using the example verifier 20. During training, each training data sample includes a list of acceptable rules as labels $y_i$ (e.g., see example Equation 2). In some examples, this list of rules can be used both as input to the RNN and to check the output of $MLP_i$, as is done in language modeling tasks.

The MultiLayer Perceptron (MLP) is further used, by the example rule distillation system 170, for the rule distillation cost function and domain adapted cost function, both of which are implemented by the example model trainer 208 to determine whether training of the example rule distillation training mode 182 and the example domain adaption mode 184 is complete. The cost function used to optimize the weights of the rule distillation neural network is a combination of the cost functions of each sub-neural network that composes the distillation mechanism. In some examples, the $MLP_i$ can be trained with a cross-entropy objective that can be evaluated by encoding a ground truth value as a one-hot vector on the possible statements of the formal language, and further compared with the output of the $MLP_i$. In some examples, the $MLP_s$ follows the same path with a cross-entropy loss and translating between a list of possible sensor IDs and their one-hot vector encodings. In some examples, the $MLP_v$ has its own cost function, implemented as mean squared error on the value of the sensor. In some examples, a regularization term for each of the network weights may be added to prevent overfitting.

The example domain adaptation mode 184 uses the example rule distillation training mode 182 with a few modifications for the unsupervised domain adaptation procedure. For example, the output of the three MLPs (e.g., $MLP_i$, $MLP_s$, $MLP_v$) can be corrected to a "target" domain given by a new embodiment and/or a new task. In some examples, the layers at the MLPs $MLP_i$, $MLP_s$, $MLP_v$) are partitioned into two parts. Weights in the last few layers from the mid-layers to the output are replaced with new initialized weights. In some examples, the outputs of the mid-layers are connected to a domain discriminator network. Such a network classifies data into source or target domain using these mid-layer features. The training proceeds by updating the new layers, the RNN, and the MLPs in the original rule distillation module. In some examples, the original labeled data together with the simulated (and unlabeled) data can be utilized for the training. In such examples, the original data can therefore be considered "source" domain and new simulated data can be set as the "target" domain. At the end of the training, the discriminator network is discarded.

Since the example domain adaptation mode 184 is unsupervised, a special cost function can be required for the unsupervised domain adaptation. In some examples, this cost function can consist of several parts: i) the outputs of $MLP_i$ and $MLP_s$ should be correctly labeled, and that of $MLP_v$ correctly regressed, for the "source" domain data as during the off-line training stage (e.g., cross entropy loss and mean squared error loss), ii) a domain discrimination loss maximizing the discriminator network output. In some examples, this discrimination loss aims at obtaining features at the input of the discriminator network that are indiscernible between both domains. Furthermore, in some examples, iii) a conditional entropy loss on the target domain data can be computed that assumes that nearby points in a cluster come from the same class. In some examples, iv) a virtual adversarial training objective is also included in the cost function.

Figure 10:
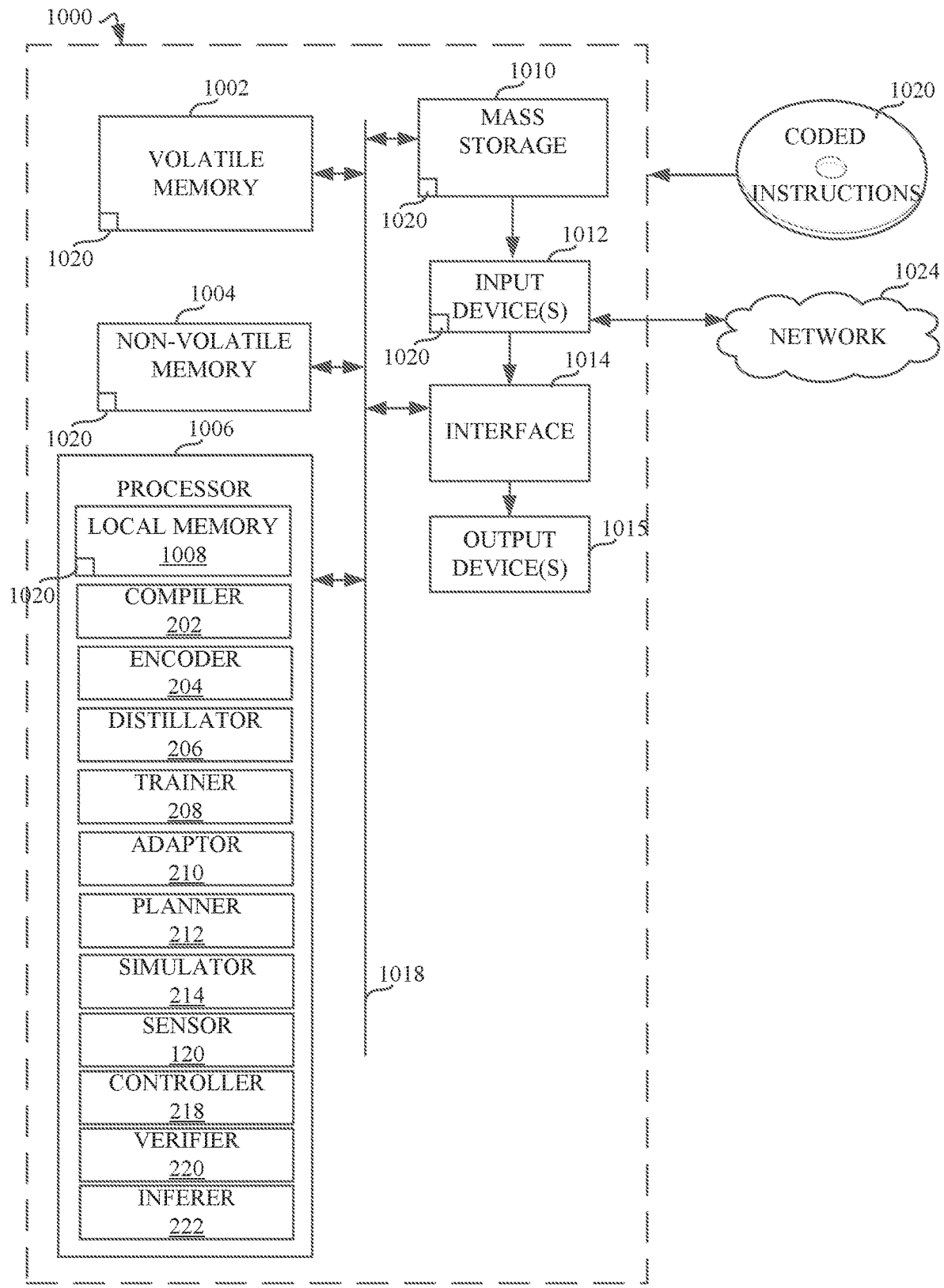
FIG. 10 is a block diagram of an example processing platform structured to execute the instructions of FIGS. 3-9 to implement the example autonomous system controller of FIG. 1B.

FIG. 10 is a block diagram of an example processing platform structured to execute the instructions of FIGS. 3-9 to implement the example autonomous system controller of FIG. 1B. The processor platform 1000 can be, for example, a server, a personal computer, a workstation, a self-learning machine (e.g., a neural network), a mobile device a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1000 of the illustrated example includes a processor 1006. The processor 1006 of the illustrated example is hardware. For example, the processor 1006 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 1006 implements the compiler the encoder 204, the distillator 206, the trainer 208, the adaptor 210, the planner 212, the simulator 214, the sensor(s) 120, the controller 218, the verifier 220, and the inferer 222.

The processor of the illustrated example includes a local memory 1008 (e.g., a cache). The processor 1006 of the illustrated example is in communication with a main memory including a volatile memory 1002 and a non-volatile memory 1004 via a bus 1018. The volatile memory 1002 may be implemented by Synchronous Dynamic Random Access Memory (SDRAM), Dynamic Random Access Memory (DRAM), RAMBUS® Dynamic Random Access Memory (RDRAM®), and/or any other type of random access memory device. The non-volatile memory 1004 may be implemented by flash memory and/or any other desired type of memory device. Access to the main memory 1002, 1004 is controlled by a memory controller.

The processor platform 1000 of the illustrated example also includes an interface circuit 1014. The interface circuit 1014 may be implemented by any type of interface standard, such as an Ethernet interface, a universal serial bus (USB), a Bluetooth® interface, a near field communication (NFC) interface, and/or a PCI express interface.

In the illustrated example, one or more input devices 1012 are connected to the interface circuit 1014. The input device(s) 1012 permit(s) a user to enter data and/or commands into the processor 1006. The input device(s) 1012 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1015 are also connected to the interface circuit 1014 of the illustrated example. The output devices 1015 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer, and/or speaker. The interface circuit 1014 of the illustrated example, thus, typically includes a graphics driver card, a graphics driver chip, and/or a graphics driver processor.

The interface circuit 1014 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1024. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1000 of the illustrated example also includes one or more mass storage devices 1010 for storing software and/or data. Examples of such mass storage devices 1010 include floppy disk drives, hard drive disks, compact disk drives, Blu-ray disk drives, redundant array of independent disks (RAID) systems, and digital versatile disk (DVD) drives.

The machine executable instructions 1020 of FIG. 10 may be stored in the interface circuit 1014, the mass storage device 1010, the processor's local memory 1008, the volatile memory 1002, the non-volatile memory 1004, and/or on a removable non-transitory computer readable storage medium such as a CD or DVD.

From the foregoing, it will be appreciated that example systems, methods, apparatus, and articles of manufacture have been disclosed that utilize deep reinforcement learning techniques that permit the generation of autonomous systems plans that can be guaranteed to satisfy safety and task accuracy criteria. The disclosed approach includes a system that validates plans and control commands by generating a formally verifiable representation of a rule set that can guarantee safe execution, adapt to an embodiment, adapt to a task, and take into consideration contextual sensor data. The examples disclosed herein further introduce the combined use of three main working modes: two offline training modes and a main online inference mode that determines whether control commands sent to a robot are acceptable under a current task and environment. The examples disclosed allow the training to proceed based on whether a given autonomous system has or has not been previously trained. For example, a system that has never been trained before can undergo a slow off-line training process that allows the system to learn a general rule set. A system that has already been trained can proceed to a less intensive training procedure that permits the autonomous system to adapt already learned acceptability criteria to a new domain using a self-supervised process that is trained using synthetic data from a simulated environment. The examples disclosed herein also provide an additional online training mode, the inference mode, that uses the robot, task, and plan to produce formally verifiable acceptance criteria. The examples disclosed herein permit the acceptance criteria rules to include safety related and performance related rules (e.g., maximum forces, torque limits, distances to a target, goal tolerances, etc.).

Disclosed herein are example methods and apparatus to generate acceptability criteria for autonomous systems plans. Example 1 includes an apparatus for validating commands of an autonomous system. The apparatus includes a data compiler to compile data generated by the autonomous system into an autonomous system task dataset, a data encoder to encode the dataset for input into a rule distillation neural network architecture, a model trainer to train the rule distillation neural network architecture, an adaptor to adapt the trained rule distillation neural network architecture to a new input data domain using the autonomous system task dataset, a verifier to generate formally verified acceptability criteria, and an inferer to evaluate a control command, the evaluation resulting in an acceptance or rejection of the command.

Example 2 includes the apparatus of Example 1, wherein the verifier generates formally verifiable criteria for at least one of an embodiment, a task, a sensed state, or a control command.

Example 3 includes the apparatus of Example 2, further including a task planner to generate a sequence of control commands, the task planner to receive at least one of an embodiment description or a task description, and a simulator to generate synthetic sensor data from a simulated environment, the simulator to receive the sequence of control commands generated by the task planner.

Example 4 includes the apparatus of Example 1, wherein the adaptor includes a self-supervised adaptation mode to modify the neural network architecture offline.

Example 5 includes the apparatus of Example 1, wherein the new input data domain includes at least one of a new embodiment description or a new task description.

Example 6 includes the apparatus of Example 1, wherein the acceptability criteria are at least one of a safety related or a performance related criteria.

Example 7 includes the apparatus of Example 1, wherein evaluation of a control command is used to determine if the control command is acceptable under at least one of a current state of the system, a current task, or a current environment.

Example 8 includes the apparatus of Example 3, wherein the adaptor is to train the system using the simulator and the task planner.

Example 9 includes the apparatus of Example 1, wherein at least one of the model trainer or adaptor include a cost function, the cost function iteratively optimized during the training, the training completed when the cost function is converged.

Example 10 includes the apparatus of Example 1, wherein the inferer is to evaluate a control command using an on-line inference mode.

Example 11 includes the apparatus of Example 1, wherein the encoder is to encode an embodiment, the embodiment input in a mark-up language, the mark-up language encoded into a numerical representation using word embedding, a recurrent neural network to output an encoded embodiment, and a task, the task encoded including at least one of unidimensional sensor values or multidimensional sensor values, wherein the unidimensional sensor values are processed as a sequence of pairs by a recurrent neural network, wherein the multidimensional sensor values are normalized and encoded using the recurrent neural network and a convolutional neural network.

Example 12 includes the apparatus of Example 1, wherein the rule distillation network architecture is to concatenate the encoded input, the input fed to a recurrent neural network, output a hidden state, the hidden state converted by a MultiLayer Perceptron (MLP) to a distribution over multiple rule statements, and output, for the rule statement, a sensor identifier, a sensor value, and an instruction, the outputs forming a rule list for formal verification by the verifier.

Example 13 includes the apparatus of Example 1, wherein the verifier includes a temporal logic requirement used to calculate a correctness measure for a reachability analysis used during the neural network training.

Example 14 includes a method of validating commands of an autonomous system, the method including compiling data generated by the autonomous system into an autonomous system task dataset, encoding the dataset for input into a rule distillation neural network architecture, training the rule distillation neural network architecture, modifying the rule distillation neural network architecture by adapting it to a new input data domain, the autonomous system task dataset used to train the modified neural network architecture, generating formally verified acceptability criteria, and evaluating a control command, the evaluation to result in an acceptance or rejection of the command.

Example 15 includes the method of Example 14, wherein the modifying of the rule distillation neural network architecture includes generating a sequence of control commands and synthetic sensor data from a simulated environment.

Example 16 includes the method of Example 14, wherein the formal verification of the acceptability criteria includes a reachability analysis for continuous measure of a robustness of an execution plan to determine constraints towards rules learned by the system.

Example 17 includes the method of Example 14, wherein training the rule distillation neural network includes feeding encoded data inputs into a recurrent neural network, the recurrent neural network generating logic rule statements for use in a rule set.

Example 18 includes the method of Example 17, wherein the rule set is generated for each of a command state and a sensed state input data, the modifying of the rule distillation neural network to iterate until a cost function is converged, the modifying of the rule distillation neural network to train the rule distillation neural network before a new command is executed, the new input data to be provided at every iteration of a control loop.

Example 19 includes the method of Example 14, wherein evaluation of a control command is used to determine if the control command is acceptable under at least one of a current state of the system, a current task, or a current environment.

Example 20 includes the method of Example 14, wherein at least one of training or modification of the neural network includes a cost function, the cost function iteratively optimized during the training, the training completed when the cost function is converged.

Example 21 includes the method of Example 14, wherein evaluation of the control command includes using an on-line inference mode.

Example 22 includes the method of Example 14, wherein the encoding includes encoding an embodiment, the embodiment input in a mark-up language, the mark-up language encoded into a numerical representation using word embedding, a recurrent neural network to output an encoded embodiment, and encoding a task, the task encoded including at least one of unidimensional sensor values or multidimensional sensor values, wherein the unidimensional sensor values are processed as a sequence of pairs by a recurrent neural network, wherein the multidimensional sensor values are normalized and encoded using the recurrent neural network and a convolutional neural network.

Example 23 includes a non-transitory computer readable storage medium including computer readable instructions that, when executed, cause one or more processors to, at least compile data generated by the autonomous system into an autonomous system task dataset, encode the dataset for input into a rule distillation neural network architecture, train the rule distillation neural network architecture, modify the rule distillation neural network architecture by adapting it to a new input data domain, the autonomous system task dataset used to train the modified neural network architecture, generate formally verified acceptability criteria, and evaluate a control command, the evaluation resulting in an acceptance or rejection of the command.

Example 24 includes the storage medium of Example 23, wherein the instructions further cause the one or more processors to generate a sequence of control commands and synthetic sensor data from a simulated environment.

Example 25 includes the storage medium of Example 23, wherein the instructions, when executed, cause the one or more processors to feed encoded data inputs into a neural network, a recurrent neural network generating logic rule statements for use in a rule set.

Example 26 includes the storage medium of Example 23, wherein the instructions, when executed, cause the one or more processors to generate a rule set for each of a command state and a sensed state input data, iterate until a cost function is converged, and train the rule distillation neural network before a new command is executed, the new input data to be provided at every iteration of a control loop.

Example 27 includes the storage medium of Example 23, wherein the instructions, when executed, cause the one or more processors to determine if the control command is acceptable under at least one of a current state of the system, a current task, or a current environment.

Example 28 includes the storage medium of Example 23, wherein the instructions, when executed, cause the one or more processors to iteratively optimize a cost function during the training, the training completed when the cost function is converged.

Example 29 includes the storage medium of Example 23, wherein the instructions, when executed, cause the one or more processors to evaluate the control command include using an on-line inference mode.

Example 30 includes the storage medium of Example 23, wherein the instructions, when executed, cause the one or more processors to encode an embodiment, the embodiment input in a mark-up language, the mark-up language encoded into a numerical representation using word embedding, a recurrent neural network to output an encoded embodiment, and encode a task, the task encoded including at least one of unidimensional sensor values or multidimensional sensor values, wherein the unidimensional sensor values are processed as a sequence of pairs by a recurrent neural network, wherein the multidimensional sensor values are normalized and encoded using the recurrent neural network and a convolutional neural network.

Example 31 includes an apparatus for validating commands of an autonomous system, the apparatus including means for compiling data generated by the autonomous system into an autonomous system task dataset, means for encoding the dataset for input into a rule distillation neural network architecture, means for training the rule distillation neural network architecture, means for modifying the rule distillation neural network architecture by adapting it to a new input data domain, the autonomous system task dataset used to train the modified neural network architecture, a first means for generating formally verified acceptability criteria, and means for evaluating a control command, the evaluation resulting in an acceptance or rejection of the command.

Example 32 includes the apparatus of Example 31, further including a second means for generating a sequence of control commands, the means for generating a sequence of control commands to receive at least one of an embodiment description or a task description, and a third means for generating synthetic sensor data from a simulated environment, the means for generating to receive the sequence of control commands generated by the means for generating a sequence of control commands.

Example 33 includes the apparatus of Example 31, wherein the means for modifying the rule distillation network includes a self-supervised adaptation mode to modify the neural network architecture offline.

Example 34 includes the apparatus of Example 31, wherein the means for evaluating a control command is used to determine if the control command is acceptable under at least one of a current state of the system, a current task, or a current environment.

Example 35 includes the apparatus of Example 32, wherein the means for modifying the rule distillation neural network is to train the system using the means for generating a sequence of control commands and the means for generating synthetic sensor data.

Example 36 includes the apparatus of Example 32, wherein at least one of the means for training or means for modifying includes a cost function, the cost function iteratively optimized during the training, the training completed when the cost function is con verged.

Example 37 includes the apparatus of Example 31, wherein the means for generating formally verified acceptability criteria is to evaluate a control command using an on-line inference mode.

Example 38 includes the apparatus of Example 31, wherein the means for encoding includes means for encoding an embodiment, the embodiment input in a mark-up language, the ark-up language encoded into a numerical representation using word embedding, a recurrent neural network to output an encoded embodiment, and means for encoding a task, the task encoded including at least one of unidimensional sensor values or multidimensional sensor values, wherein the unidimensional sensor values are processed as a sequence of pairs by a recurrent neural network, wherein the multidimensional sensor values are normalized and encoded using the recurrent neural network and a convolutional neural network.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus for validating commands of an autonomous system, the apparatus comprising:
   a data compiler to compile data generated by the autonomous system into an autonomous system task dataset;
   a data encoder to encode the dataset for input into a rule distillation neural network architecture;
   a model trainer to train the rule distillation neural network architecture;
   an adaptor to adapt the trained rule distillation neural network architecture to a new input data domain using the autonomous system task dataset;
   a verifier to generate formally verified acceptability criteria; and
   an inferer to evaluate a control command, the evaluation resulting in an acceptance or rejection of the command.

2. The apparatus of claim 1, wherein the verifier generates formally verifiable criteria for at least one of an embodiment, a task, a sensed state, or a control command.

3. The apparatus of claim 2, further including:
   a task planner to generate a sequence of control commands, the task planner to receive at least one of an embodiment description or a task description; and
   a simulator to generate synthetic sensor data from a simulated environment, the simulator to receive the sequence of control commands generated by the task planner.

4. The apparatus of claim 1, wherein the adaptor includes a self-supervised adaptation mode to modify the neural network architecture offline.

5. The apparatus of claim 1, wherein the new input data domain includes at least one of a new embodiment description or a new task description.

6. The apparatus of claim 1, wherein the acceptability criteria are at least one of a safety related or a performance related criteria.

7. The apparatus of claim 1, wherein evaluation of a control command is used to determine if the control command is acceptable under at least one of a current state of the system, a current task, or a current environment.

8. The apparatus of claim 3, wherein the adaptor is to train the system using the simulator and the task planner.

9. The apparatus of claim 1, wherein at least one of the model trainer or adaptor include a cost function, the cost function iteratively optimized during the training, the training completed when the cost function is converged.

10. The apparatus of claim 1, wherein the inferer is to evaluate a control command using an on-line inference mode.

11. The apparatus of claim 1, wherein the encoder is to encode:
    an embodiment, the embodiment input in a mark-up language, the mark-up language encoded into a numerical representation using word embedding, a recurrent neural network to output an encoded embodiment; and
    a task, the task encoded including at least one of unidimensional sensor values or multidimensional sensor values, wherein the unidimensional sensor values are processed as a sequence of pairs by a recurrent neural network, wherein the multidimensional sensor values are normalized and encoded using the recurrent neural network and a convolutional neural network.

12. The apparatus of claim 1, wherein the rule distillation network architecture is to:
    concatenate the encoded input, the input fed to a recurrent neural network;

output a hidden state, the hidden state converted by a MultiLayer Perceptron (MLP) to a distribution over multiple rule statements; and output, for the rule statement, a sensor identifier, a sensor value, and an instruction, the outputs forming a rule list for formal verification by the verifier.

13. The apparatus of claim 1, wherein the verifier includes a temporal logic requirement used to calculate a correctness measure for a reachability analysis used during the neural network training.

14. A method of validating commands of an autonomous system, the method comprising:
compiling data generated by the autonomous system into an autonomous system task dataset;
encoding the dataset for input into a rule distillation neural network architecture;
training the rule distillation neural network architecture;
modifying the rule distillation neural network architecture by adapting it to a new input data domain, the autonomous system task dataset used to train the modified neural network architecture;
generating formally verified acceptability criteria; and
evaluating a control command, the evaluation to result in an acceptance or rejection of the command.

15. The method of claim 14, wherein the modifying of the rule distillation neural network architecture includes generating a sequence of control commands and synthetic sensor data from a simulated environment.

16. The method of claim 14, wherein the formal verification of the acceptability criteria includes a reachability analysis for continuous measure of a robustness of an execution plan to determine constraints towards rules learned by the system.

17. The method of claim 14, wherein training the rule distillation neural network includes feeding encoded data inputs into a recurrent neural network, the recurrent neural network generating logic rule statements for use in a rule set.

18. The method of claim 14, wherein the encoding includes:
encoding an embodiment, the embodiment input in a mark-up language, the mark-up language encoded into a numerical representation using word embedding, a recurrent neural network to output an encoded embodiment; and
encoding a task, the task encoded including at least one of unidimensional sensor values or multidimensional sensor values, wherein the unidimensional sensor values are processed as a sequence of pairs by a recurrent neural network, wherein the multidimensional sensor values are normalized and encoded using the recurrent neural network and a convolutional neural network.

19. A non-transitory computer readable storage medium comprising computer readable instructions that, when executed, cause one or more processors to, at least:
compile data generated by an autonomous system into an autonomous system task dataset;
encode the dataset for input into a rule distillation neural network architecture;
train the rule distillation neural network architecture;
modify the rule distillation neural network architecture by adapting it to a new input data domain, the autonomous system task dataset used to train the modified neural network architecture;
generate formally verified acceptability criteria; and
evaluate a control command, the evaluation resulting in an acceptance or rejection of the command.

20. The storage medium of claim 19, wherein the instructions further cause the one or more processors to generate a sequence of control commands and synthetic sensor data from a simulated environment.

21. The storage medium of claim 19, wherein the instructions, when executed, cause the one or more processors to feed encoded data inputs into a recurrent neural network, a recurrent neural network generating logic rule statements for use in a rule set.

22. The storage medium of claim 19, wherein the instructions, when executed, cause the one or more processors to generate a rule set for each of a command state and a sensed state input data, iterate until a cost function is converged, and train the rule distillation neural network before a new command is executed, the new input data to be provided at every iteration of a control loop.

23. The storage medium of claim 19, wherein the instructions, when executed, cause the one or more processors to determine if the control command is acceptable under at least one of a current state of the system, a current task, or a current environment.

24. An apparatus for validating commands of an autonomous system, the apparatus comprising:
means for compiling data generated by the autonomous system into an autonomous system task dataset;
means for encoding the dataset for input into a rule distillation neural network architecture;
means for training the rule distillation neural network architecture;
means for modifying the rule distillation neural network architecture by adapting it to a new input data domain, the autonomous system task dataset used to train the modified neural network architecture;
a first means for generating formally verified acceptability criteria; and
means for evaluating a control command, the evaluation resulting in an acceptance or rejection of the command.

25. The apparatus of claim 24, further including:
a second means for generating a sequence of control commands, the means for generating a sequence of control commands to receive at least one of an embodiment description or a task description; and
a third means for generating synthetic sensor data from a simulated environment, the means for generating to receive the sequence of control commands generated by the means for generating a sequence of control commands.

* * * * *